(12) United States Patent
McQuade et al.

(10) Patent No.: US 10,600,096 B2
(45) Date of Patent: *Mar. 24, 2020

(54) SYSTEM AND METHOD FOR OBTAINING COMPETITIVE PRICING FOR VEHICLE SERVICES

(75) Inventors: Charles Michael McQuade, Issaquah, WA (US); Brett Brinton, Seattle, WA (US)

(73) Assignee: ZONAR SYSTEMS, INC., Seattle, WA (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/157,184

(22) Filed: Jun. 9, 2011

(65) Prior Publication Data

US 2012/0136527 A1    May 31, 2012

Related U.S. Application Data

(63) Continuation-in-part of application No. 12/956,961, filed on Nov. 30, 2010, now abandoned.

(51) Int. Cl.
*G06Q 30/06* (2012.01)
*G06Q 30/08* (2012.01)

(52) U.S. Cl.
CPC ......... *G06Q 30/0611* (2013.01); *G06Q 30/08* (2013.01)

(58) Field of Classification Search
None
See application file for complete search history.

(56) References Cited

U.S. PATENT DOCUMENTS

| 3,573,620 A | 4/1971 | Ashley et al. |
| 3,990,067 A | 11/1976 | Van Dusen et al. |

(Continued)

FOREIGN PATENT DOCUMENTS

| CA | 2138378 A1 | 11/1994 |
| CA | 2326892 A1 | 10/1999 |

(Continued)

OTHER PUBLICATIONS

Frost & Sullivan Press Release, "Remote Vehicle Diagnostics—The Quiet Revolution Signalling a New Era for Auto Makers", (Oct. 10, 2002), http://www.frost.com/prod/servlet/press-release-print.pag?docid=KMEE-5ESE9W.*

(Continued)

*Primary Examiner* — Paul R Fisher
(74) *Attorney, Agent, or Firm* — Seed IP Law Group LLP

(57) ABSTRACT

In order to obtain competitive pricing for vehicle servicing, a pricing service provider is used to obtain pricing data from a plurality of service vendors. In at least some embodiments, one or more of the following types of additional information for each vendor will be provided along with the pricing data, to enable the consumer (the owner or operator of the vehicle) to make an informed selection: a rating of the vendor, a relative distance between the consumer (or known vehicle location) and the vendor, and a time period defining when the vendor will be able to accommodate the service. In at least some embodiments, a pricing service provider hosts a reverse auction for the benefit of the consumer. In at least some embodiment, the pricing service provider hosts a webpage upon which results of the service requests from the plurality of vendors are displayed.

16 Claims, 13 Drawing Sheets

(56) References Cited

U.S. PATENT DOCUMENTS

| | | | |
|---|---|---|---|
| 4,025,791 A | 5/1977 | Lennington et al. |
| 4,092,718 A | 5/1978 | Wendt |
| 4,258,421 A | 3/1981 | Juhasz et al. |
| 4,263,945 A | 4/1981 | Van Ness |
| 4,325,057 A | 4/1982 | Bishop |
| 4,469,149 A | 9/1984 | Walkey et al. |
| 4,602,127 A | 7/1986 | Neely et al. |
| 4,658,371 A | 4/1987 | Walsh et al. |
| 4,763,356 A | 8/1988 | Day, Jr. et al. |
| 4,799,162 A | 1/1989 | Shinkawa et al. |
| 4,804,937 A | 2/1989 | Barbiaux et al. |
| 4,846,233 A | 7/1989 | Fockens |
| 4,897,792 A | 1/1990 | Hosoi |
| 4,934,419 A | 6/1990 | Lamont et al. |
| 4,935,195 A | 6/1990 | Palusamy et al. |
| 5,058,044 A | 10/1991 | Stewart et al. |
| 5,068,656 A | 11/1991 | Sutherland |
| 5,072,380 A | 12/1991 | Randelman et al. |
| 5,120,942 A | 6/1992 | Holland et al. |
| 5,128,651 A | 7/1992 | Heckart |
| 5,204,819 A | 4/1993 | Ryan |
| 5,206,643 A | 4/1993 | Eckelt |
| 5,223,844 A | 6/1993 | Mansell et al. |
| 5,243,323 A | 9/1993 | Rogers |
| 5,321,629 A | 6/1994 | Shirata et al. |
| 5,337,003 A | 8/1994 | Carmichael et al. |
| 5,359,522 A | 10/1994 | Ryan |
| 5,394,136 A | 2/1995 | Lammers et al. |
| 5,399,844 A | 3/1995 | Holland |
| 5,400,018 A | 3/1995 | Scholl et al. |
| 5,442,553 A | 8/1995 | Parrillo |
| 5,459,304 A | 10/1995 | Eisenmann |
| 5,459,660 A | 10/1995 | Berra |
| 5,479,479 A | 12/1995 | Braitberg et al. |
| 5,488,352 A | 1/1996 | Jasper |
| 5,499,182 A | 3/1996 | Ousborne |
| 5,541,845 A | 7/1996 | Klein |
| 5,546,305 A | 8/1996 | Kondo |
| 5,557,254 A | 9/1996 | Johnson et al. |
| 5,557,268 A | 9/1996 | Hughes et al. |
| 5,572,192 A | 11/1996 | Berube |
| 5,585,552 A | 12/1996 | Heuston et al. |
| 5,594,650 A | 1/1997 | Shah et al. |
| 5,596,501 A | 1/1997 | Comer et al. |
| 5,598,534 A | 1/1997 | Haas |
| 5,600,323 A | 2/1997 | Boschini |
| 5,610,596 A | 3/1997 | Petitclerc |
| 5,623,258 A | 4/1997 | Dorfman |
| 5,629,678 A | 5/1997 | Gargano et al. |
| 5,671,141 A | 9/1997 | Smith et al. |
| 5,671,158 A | 9/1997 | Fournier et al. |
| 5,680,328 A | 10/1997 | Skorupski et al. |
| 5,719,771 A | 2/1998 | Buck et al. |
| 5,731,893 A | 3/1998 | Dominique |
| 5,732,074 A | 3/1998 | Spaur et al. |
| 5,742,915 A | 4/1998 | Stafford |
| 5,745,049 A | 4/1998 | Akiyama et al. |
| 5,758,299 A | 5/1998 | Sandborg et al. |
| 5,758,300 A | 5/1998 | Abe |
| 5,781,871 A | 7/1998 | Mezger et al. |
| 5,794,164 A | 8/1998 | Beckert et al. |
| 5,808,565 A | 9/1998 | Matta et al. |
| 5,809,437 A | 9/1998 | Breed |
| 5,815,071 A | 9/1998 | Doyle |
| 5,835,871 A | 11/1998 | Smith et al. |
| 5,838,251 A | 11/1998 | Brinkmeyer et al. |
| 5,839,112 A | 11/1998 | Schreitmueller et al. |
| 5,862,223 A * | 1/1999 | Walker ............ G06Q 10/063112 705/50 |
| 5,867,404 A | 2/1999 | Bryan |
| 5,874,891 A | 2/1999 | Lowe |
| 5,884,202 A | 3/1999 | Arjomand |
| 5,890,061 A | 3/1999 | Timm et al. |
| 5,890,520 A | 4/1999 | Johnson, Jr. |
| 5,913,180 A | 6/1999 | Ryan |
| 5,920,846 A | 7/1999 | Storch et al. |
| 5,922,037 A | 7/1999 | Potts |
| 5,923,572 A | 7/1999 | Pollock |
| 5,942,753 A | 8/1999 | Dell |
| 5,956,259 A | 9/1999 | Hartsell, Jr. et al. |
| 5,974,483 A | 10/1999 | Ray et al. |
| 5,995,898 A | 11/1999 | Tuttle |
| 6,009,355 A | 12/1999 | Obradovich et al. |
| 6,009,363 A | 12/1999 | Beckert et al. |
| 6,016,795 A | 1/2000 | Ohki |
| 6,024,142 A | 2/2000 | Bates |
| 6,025,776 A | 2/2000 | Matsuura |
| 6,043,661 A | 3/2000 | Gutierrez |
| 6,054,950 A | 4/2000 | Fontana |
| 6,061,614 A | 5/2000 | Carrender et al. |
| 6,064,299 A | 5/2000 | Lesesky et al. |
| 6,070,156 A | 5/2000 | Hartsell, Jr. |
| 6,078,255 A | 6/2000 | Dividock et al. |
| 6,084,870 A | 7/2000 | Wooten et al. |
| 6,092,021 A | 7/2000 | Ehlbeck et al. |
| 6,107,915 A | 8/2000 | Reavell et al. |
| 6,107,917 A | 8/2000 | Carrender et al. |
| 6,112,152 A | 8/2000 | Tuttle |
| 6,127,947 A | 10/2000 | Uchida et al. |
| 6,128,551 A | 10/2000 | Davis et al. |
| 6,128,959 A | 10/2000 | McGovern et al. |
| 6,169,938 B1 | 1/2001 | Hartsell, Jr. |
| 6,169,943 B1 | 1/2001 | Simon et al. |
| 6,181,994 B1 | 1/2001 | Colson et al. |
| 6,182,275 B1 * | 1/2001 | Beelitz ...................... G06F 8/63 707/999.004 |
| 6,199,099 B1 | 3/2001 | Gershman et al. |
| 6,202,008 B1 | 3/2001 | Beckert et al. |
| 6,208,948 B1 | 3/2001 | Klingler et al. |
| 6,236,911 B1 | 5/2001 | Kruger |
| 6,240,365 B1 | 5/2001 | Bunn |
| 6,246,688 B1 | 6/2001 | Angwin et al. |
| 6,253,129 B1 | 6/2001 | Jenkins et al. |
| 6,256,579 B1 | 7/2001 | Tanimoto |
| 6,259,358 B1 | 7/2001 | Fjordbotten |
| 6,263,268 B1 | 7/2001 | Nathanson |
| 6,263,273 B1 | 7/2001 | Henneken et al. |
| 6,263,276 B1 | 7/2001 | Yokoyama et al. |
| 6,278,936 B1 | 8/2001 | Jones |
| 6,285,953 B1 | 9/2001 | Harrison et al. |
| 6,295,492 B1 | 9/2001 | Lang et al. |
| 6,330,499 B1 | 12/2001 | Chou et al. |
| 6,338,152 B1 | 1/2002 | Fera et al. |
| 6,339,745 B1 | 1/2002 | Novik |
| 6,362,730 B2 | 3/2002 | Razavi et al. |
| 6,370,454 B1 | 4/2002 | Moore |
| 6,374,176 B1 | 4/2002 | Schmier et al. |
| 6,380,951 B1 | 4/2002 | Petchenkine et al. |
| 6,396,413 B2 | 5/2002 | Hines et al. |
| 6,408,232 B1 | 6/2002 | Cannon et al. |
| 6,411,203 B1 | 6/2002 | Lesesky et al. |
| 6,411,891 B1 | 6/2002 | Jones |
| 6,417,760 B1 | 7/2002 | Mabuchi et al. |
| 6,438,472 B1 | 8/2002 | Tano et al. |
| 6,450,411 B1 | 9/2002 | Rash et al. |
| 6,456,039 B1 | 9/2002 | Lauper et al. |
| 6,502,030 B2 | 12/2002 | Hilleary |
| 6,502,303 B2 | 1/2003 | Updegrove et al. |
| 6,505,106 B1 | 1/2003 | Lawrence et al. |
| 6,507,810 B2 | 1/2003 | Razavi et al. |
| 6,526,335 B1 | 2/2003 | Treyz et al. |
| 6,529,723 B1 | 3/2003 | Bentley |
| 6,529,808 B1 | 3/2003 | Diem |
| 6,539,296 B2 | 3/2003 | Diaz et al. |
| 6,578,005 B1 | 6/2003 | Lesaint et al. |
| 6,587,768 B2 | 7/2003 | Chene et al. |
| 6,594,579 B1 | 7/2003 | Lowrey et al. |
| 6,594,621 B1 | 7/2003 | Meeker |
| 6,597,973 B1 | 7/2003 | Barich et al. |
| 6,604,033 B1 | 8/2003 | Banet et al. |
| 6,608,554 B2 | 8/2003 | Lesesky et al. |
| 6,609,051 B2 * | 8/2003 | Fiechter et al. ............. 701/29.3 |
| 6,609,082 B2 | 8/2003 | Wagner |
| 6,611,740 B2 | 8/2003 | Lowrey et al. |

(56) References Cited

U.S. PATENT DOCUMENTS

| | | |
|---|---|---|
| 6,614,392 B2 | 9/2003 | Howard |
| 6,615,184 B1 | 9/2003 | Hicks |
| 6,616,036 B2 | 9/2003 | Streicher et al. |
| 6,621,452 B2 | 9/2003 | Knockeart et al. |
| 6,631,322 B1 | 10/2003 | Arthur |
| 6,636,790 B1 | 10/2003 | Lightner et al. |
| 6,664,897 B2 | 12/2003 | Pape et al. |
| 6,671,646 B2 | 12/2003 | Manegold et al. |
| 6,679,110 B2 | 1/2004 | Oka et al. |
| 6,680,694 B1 | 1/2004 | Knockeart et al. |
| 6,708,113 B1 | 3/2004 | Von Gerlach et al. |
| 6,714,859 B2 | 3/2004 | Jones |
| 6,727,818 B1 | 4/2004 | Wildman et al. |
| 6,732,031 B1 | 5/2004 | Lightner et al. |
| 6,732,032 B1 | 5/2004 | Banet et al. |
| 6,744,352 B2 | 6/2004 | Lesesky et al. |
| 6,754,183 B1 | 6/2004 | Razavi et al. |
| 6,754,570 B2 | 6/2004 | Iihoshi |
| 6,768,994 B1 | 7/2004 | Howard et al. |
| 6,801,841 B2 | 10/2004 | Tabe |
| 6,804,606 B2 | 10/2004 | Jones |
| 6,804,626 B2 | 10/2004 | Manegold et al. |
| 6,816,762 B2 | 11/2004 | Hensey et al. |
| 6,834,259 B1 | 12/2004 | Markwitz et al. |
| 6,856,820 B1 | 2/2005 | Kolls |
| 6,876,642 B1 | 4/2005 | Adams et al. |
| 6,879,894 B1 | 4/2005 | Lightner et al. |
| 6,880,390 B2 | 4/2005 | Emord |
| 6,894,617 B2 | 5/2005 | Richman |
| 6,899,151 B1 | 5/2005 | Latka et al. |
| 6,904,359 B2 | 6/2005 | Jones |
| 6,909,947 B2 | 6/2005 | Douros et al. |
| 6,924,750 B2 | 8/2005 | Flick |
| 6,928,348 B1 | 8/2005 | Lightner et al. |
| 6,946,953 B2 | 9/2005 | Lesesky et al. |
| 6,952,645 B1 | 10/2005 | Jones |
| 6,954,689 B2 | 10/2005 | Hanson et al. |
| 6,957,133 B1 | 10/2005 | Hunt et al. |
| 6,959,327 B1 | 10/2005 | Vogl et al. |
| 6,968,259 B2 | 11/2005 | Simons et al. |
| 6,972,668 B2 | 12/2005 | Schauble |
| 6,988,033 B1 | 1/2006 | Lowrey et al. |
| 7,022,018 B2 | 4/2006 | Koga |
| 7,027,955 B2 | 4/2006 | Markwitz et al. |
| 7,048,185 B2 | 5/2006 | Hart |
| 7,068,301 B2 | 6/2006 | Thompson |
| 7,096,193 B1 | 8/2006 | Beaudoin et al. |
| 7,103,460 B1 | 9/2006 | Breed |
| 7,113,127 B1 | 9/2006 | Banet et al. |
| 7,117,121 B2 | 10/2006 | Brinton et al. |
| 7,142,099 B2 | 11/2006 | Ross et al. |
| 7,155,199 B2 | 12/2006 | Zalewski et al. |
| 7,155,322 B2 | 12/2006 | Nakahara et al. |
| 7,171,372 B2 | 1/2007 | Daniel et al. |
| 7,174,243 B1 | 2/2007 | Lightner et al. |
| 7,174,277 B2 | 2/2007 | Vock et al. |
| 7,188,073 B1 | 3/2007 | Tam et al. |
| 7,219,066 B2 | 5/2007 | Parks et al. |
| 7,225,065 B1 | 5/2007 | Hunt et al. |
| 7,228,211 B1 | 6/2007 | Lowrey et al. |
| 7,254,516 B2 | 8/2007 | Case, Jr. et al. |
| 7,343,252 B2 | 3/2008 | Wiens |
| 7,362,229 B2 | 4/2008 | Brinton et al. |
| 7,401,025 B1 | 7/2008 | Lokitz |
| 7,408,480 B2 | 8/2008 | Woo et al. |
| 7,421,321 B2 | 9/2008 | Breed et al. |
| 7,421,334 B2 | 9/2008 | Dahlgren et al. |
| 7,447,574 B1 | 11/2008 | Washicko et al. |
| 7,447,968 B2 | 11/2008 | Ha et al. |
| 7,477,968 B1 | 1/2009 | Lowrey et al. |
| 7,480,551 B1 | 1/2009 | Lowrey et al. |
| 7,490,086 B2 | 2/2009 | Joao |
| 7,500,151 B2 | 3/2009 | Englert et al. |
| 7,523,159 B1 | 4/2009 | Williams et al. |
| 7,532,962 B1 | 5/2009 | Lowrey et al. |
| 7,532,963 B1 | 5/2009 | Lowrey et al. |
| 7,596,437 B1 | 9/2009 | Hunt et al. |
| 7,604,169 B2 | 10/2009 | Demere |
| 7,627,546 B2 | 12/2009 | Moser et al. |
| 7,640,185 B1 | 12/2009 | Giordano et al. |
| 7,650,210 B2 | 1/2010 | Breed |
| 7,672,756 B2 | 3/2010 | Breed |
| 7,672,763 B1 | 3/2010 | Hunt et al. |
| 7,680,594 B2 | 3/2010 | Cabral et al. |
| 7,729,977 B2 * | 6/2010 | Xiao et al. ............ 705/37 |
| 7,778,752 B1 | 8/2010 | Hunt et al. |
| 7,783,507 B2 | 8/2010 | Schick et al. |
| 7,844,500 B2 | 11/2010 | Ran |
| 7,849,149 B2 | 12/2010 | Habaguchi et al. |
| 7,869,906 B2 | 1/2011 | Louch et al. |
| 7,933,841 B2 | 4/2011 | Schmeyer et al. |
| 7,983,960 B2 | 7/2011 | Rigole |
| 8,099,308 B2 | 1/2012 | Uyeki |
| 8,131,417 B2 | 3/2012 | Picard |
| 8,251,702 B2 | 8/2012 | Marks |
| 8,630,765 B2 | 1/2014 | Chen |
| 8,694,328 B1 | 4/2014 | Gormley |
| 2001/0037281 A1 | 11/2001 | French et al. |
| 2001/0039508 A1 | 11/2001 | Nagler et al. |
| 2001/0047283 A1 | 11/2001 | Melick et al. |
| 2001/0048222 A1 | 12/2001 | Mitchell |
| 2001/0053983 A1 | 12/2001 | Reichwein et al. |
| 2002/0016655 A1 | 2/2002 | Joao |
| 2002/0022979 A1 | 2/2002 | Whipp et al. |
| 2002/0032597 A1 | 3/2002 | Chanos |
| 2002/0038233 A1 | 3/2002 | Shubov et al. |
| 2002/0059046 A1 | 5/2002 | Mifune et al. |
| 2002/0065698 A1 | 5/2002 | Schick et al. |
| 2002/0082912 A1 | 6/2002 | Batachia et al. |
| 2002/0087522 A1 * | 7/2002 | MacGregor et al. ............ 707/3 |
| 2002/0107833 A1 | 8/2002 | Kerkinni |
| 2002/0107873 A1 | 8/2002 | Winkler et al. |
| 2002/0111725 A1 | 8/2002 | Burge |
| 2002/0111897 A1 * | 8/2002 | Davis ............... 705/37 |
| 2002/0120696 A1 | 8/2002 | Mousseau et al. |
| 2002/0133273 A1 * | 9/2002 | Lowrey ............. G01M 15/04 |
| | | 701/29.4 |
| 2002/0133275 A1 | 9/2002 | Thibault |
| 2002/0133374 A1 | 9/2002 | Agoni et al. |
| 2002/0150050 A1 | 10/2002 | Nathanson |
| 2002/0160793 A1 | 10/2002 | Pradhan et al. |
| 2002/0177926 A1 | 11/2002 | Lockwood et al. |
| 2002/0178147 A1 | 11/2002 | Arroyo et al. |
| 2002/0183972 A1 | 12/2002 | Enck et al. |
| 2003/0028297 A1 | 2/2003 | Iihoshi et al. |
| 2003/0030550 A1 | 2/2003 | Talbot |
| 2003/0055666 A1 | 3/2003 | Roddy et al. |
| 2003/0061005 A1 | 3/2003 | Manegold et al. |
| 2003/0097218 A1 | 5/2003 | Borugian |
| 2003/0120745 A1 | 6/2003 | Katagishi et al. |
| 2003/0233278 A1 | 12/2003 | Marshall |
| 2004/0049450 A1 | 3/2004 | Lussler |
| 2004/0139047 A1 | 7/2004 | Rechsteiner et al. |
| 2004/0153356 A1 * | 8/2004 | Lockwood et al. ............ 705/9 |
| 2004/0199412 A1 * | 10/2004 | McCauley ............ 705/7 |
| 2004/0236596 A1 | 11/2004 | Chowdhary et al. |
| 2004/0243464 A1 | 12/2004 | Beck |
| 2005/0038688 A1 | 2/2005 | Collins et al. |
| 2005/0065853 A1 | 3/2005 | Ferreira |
| 2005/0103874 A1 | 5/2005 | Erdman, Jr. |
| 2005/0125117 A1 | 6/2005 | Breed |
| 2005/0149250 A1 | 7/2005 | Isaac |
| 2005/0222756 A1 | 10/2005 | Davis et al. |
| 2005/0228707 A1 | 10/2005 | Hendrickson |
| 2005/0240459 A1 | 10/2005 | Cox |
| 2005/0273250 A1 | 12/2005 | Hamilton et al. |
| 2005/0288830 A1 | 12/2005 | Reeser et al. |
| 2006/0015404 A1 | 1/2006 | Tran |
| 2006/0025966 A1 | 2/2006 | Kanamaru |
| 2006/0052921 A1 | 3/2006 | Bodin et al. |
| 2006/0089767 A1 | 4/2006 | Sowa |
| 2006/0100919 A1 | 5/2006 | Levine |
| 2006/0129309 A1 | 6/2006 | Alewine et al. |
| 2006/0184381 A1 | 8/2006 | Rice et al. |

(56) References Cited

U.S. PATENT DOCUMENTS

| | | |
|---|---|---|
| 2006/0195365 A1 | 8/2006 | Karabetsos |
| 2006/0232406 A1 | 10/2006 | Filibeck |
| 2006/0282364 A1 | 12/2006 | Berg |
| 2007/0050193 A1 | 3/2007 | Larson |
| 2007/0069947 A1 | 3/2007 | Banet et al. |
| 2007/0100519 A1 | 5/2007 | Engel |
| 2007/0124283 A1* | 5/2007 | Gotts et al. ............ 707/3 |
| 2007/0179709 A1 | 8/2007 | Doyle |
| 2007/0203769 A1 | 8/2007 | Thomas |
| 2007/0208630 A1 | 9/2007 | Chatter et al. |
| 2007/0244797 A1 | 10/2007 | Hinson et al. |
| 2007/0244800 A1 | 10/2007 | Lee et al. |
| 2007/0266180 A1 | 11/2007 | Mitchell et al. |
| 2008/0040129 A1 | 2/2008 | Cauwels et al. |
| 2008/0049123 A1 | 2/2008 | Gloudemans et al. |
| 2008/0119981 A1* | 5/2008 | Chen ............ 701/33 |
| 2008/0154489 A1 | 6/2008 | Kaneda et al. |
| 2008/0154712 A1 | 6/2008 | Wellman |
| 2008/0167758 A1 | 7/2008 | Louch et al. |
| 2008/0177653 A1 | 7/2008 | Famolari et al. |
| 2008/0189199 A1 | 8/2008 | Sarid et al. |
| 2008/0228619 A1 | 9/2008 | Locker et al. |
| 2008/0249813 A1 | 10/2008 | Schmeyer |
| 2008/0263016 A1 | 10/2008 | Lokitz |
| 2008/0288830 A1 | 11/2008 | Marinucci |
| 2008/0294556 A1 | 11/2008 | Anderson |
| 2008/0306960 A1 | 12/2008 | Poechmueller et al. |
| 2008/0319665 A1 | 12/2008 | Berkobin et al. |
| 2009/0062978 A1* | 3/2009 | Picard ............ 701/29 |
| 2009/0069999 A1 | 3/2009 | Bos |
| 2009/0089149 A1 | 4/2009 | Lerner et al. |
| 2009/0177350 A1 | 7/2009 | Williams et al. |
| 2009/0192854 A1 | 7/2009 | Pietrucha, Jr. et al. |
| 2009/0222200 A1 | 9/2009 | Link, II et al. |
| 2009/0254240 A1 | 10/2009 | Olsen, III et al. |
| 2009/0276115 A1 | 11/2009 | Chen |
| 2010/0010705 A1* | 1/2010 | Duddle ............ G07C 5/085 701/31.4 |
| 2010/0036595 A1 | 2/2010 | Coy et al. |
| 2010/0088127 A1 | 4/2010 | Betancourt et al. |
| 2010/0106534 A1* | 4/2010 | Robinson et al. ............ 705/5 |
| 2010/0114423 A1 | 5/2010 | Boss et al. |
| 2010/0217680 A1 | 8/2010 | Fusz et al. |
| 2010/0257104 A1 | 10/2010 | Bundy |
| 2011/0012720 A1 | 1/2011 | Hirschfeld |
| 2011/0118934 A1 | 5/2011 | Lowrey et al. |
| 2011/0225096 A1 | 9/2011 | Cho et al. |
| 2011/0302046 A1 | 12/2011 | Arian |
| 2012/0028680 A1 | 2/2012 | Breed |
| 2012/0053778 A1 | 3/2012 | Colvin et al. |
| 2012/0130844 A1 | 5/2012 | Picard |
| 2012/0136743 A1 | 5/2012 | McQuade et al. |
| 2012/0136802 A1 | 5/2012 | McQuade et al. |
| 2016/0071338 A1 | 3/2016 | McQuade et al. |
| 2016/0342456 A1 | 11/2016 | McQuade et al. |
| 2016/0343177 A1 | 11/2016 | McQuade et al. |
| 2016/0350985 A1 | 12/2016 | McQuade et al. |
| 2017/0076344 A1 | 3/2017 | McQuade et al. |

FOREIGN PATENT DOCUMENTS

| | | |
|---|---|---|
| CA | 2388572 A1 | 5/2001 |
| EP | 1067498 A1 | 1/2001 |
| EP | 0814447 B1 | 9/2002 |
| EP | 0926020 A3 | 9/2002 |
| EP | 0755039 B1 | 12/2002 |
| EP | 1005627 B1 | 10/2003 |
| EP | 1027792 B1 | 1/2004 |
| EP | 1271374 B1 | 5/2004 |
| EP | 2116968 A1 | 11/2009 |
| JP | 2007102336 A | 4/2007 |
| JP | 2008217341 A | 9/2008 |
| KR | 1020070006134 A | 1/2007 |
| KR | 1020090063024 A | 6/2009 |
| KR | 1020100023434 A | 3/2010 |
| KR | 100987319 B1 | 10/2010 |
| WO | WO9726750 A1 | 7/1997 |
| WO | WO9803952 A1 | 1/1998 |
| WO | WO9830920 A2 | 7/1998 |
| WO | WO03023550 A2 | 3/2003 |
| WO | WO2007033311 A2 | 3/2007 |
| WO | WO2007092711 A2 | 8/2007 |

OTHER PUBLICATIONS

Colvin et al., "Method and Apparatus for Remote Vehicle Diagnosis," U.S. Appl. No. 13/219,467, Office Action, dated Mar. 27, 2015, 88 pages.

McQuade et al., "System and Method for Vehicle Maintenance Including Remote Diagnosis and Reverse Auction for Identified Repairs," U.S. Appl. No. 12/956,961, Final Office Action, dated Aug. 11, 2015 28 pages.

The Extended European Search Report dated May 9, 2014 for European patent application No. 11845242.4, a counterpart foreign application of U.S. Appl. No. 12/956,961, 7 pages.

EPA, "Frequent Questions—On-Board Diagnostic—OTAQ—EPA", Sep. 15, 2005, retrieved on Dec. 9, 2014 at <<http://web.archive.org/web/20050915205926/http://www.epa.gov/obd/questions.htm>>, 4 pages.

Ford, "OBD System Operation Summary for 6.4L Diesel Engine", retrieved at <<https://www.motorcraftservice.com/vdirs/diagnostics/pdf/DOBDSM804>>, Apr. 28, 2008, pp. 1-66.

IBM Terminology, "The Letter "R"", retrieved on Dec. 11, 2014 at <<http://www.01.ibm.com/software/globalization/terminology/r.html>>, 137 pages.

IBM Terminology, "The Term "Buffer"", retrieved on Dec. 11, 2014 at <<http://www-01.ibm.com/software/globalization/terminology/b.html#x2015805>>, 69 pages.

Office action for U.S. Appl. No. 13/157,203, dated Oct. 7, 2014, Charles Michael McQuade, "System and Method for Obtaining Competitive Pricing for Vehicle Services", 59 pages.

Office Action for U.S. Appl. No. 12/956,961, dated Dec. 16, 2014, Charles Michael McQuade, "System and Method for Vehicle Maintenance Including Remote Diagnosis and Reverse Auction for Identified Repairs", 118 pages.

Albright, B., "Indiana Embarks on Ambitious RFID roll out," Frontline Solutions, May 20, 2002, 2pp. Available at: <<http://www.frontlinetoday.com/frontline/article/articleDetail.jsp?id=19358>>.

"D.O.T. Driver Vehicle Inspection Reports on your wireless phone!" FleeTTrakkeR LLC, 2002-2003, <<http://www.fleettrakker.com/web/index.jsp>> Accessed Mar. 12, 2004.

"Detex Announces the Latest Innovation in Guard Tour Verification Technology," Detex Life Safety, Security and Security Assurance, Jan. 1, 2003, 1pp. Copyright 2002-2004, Detex Corporation. <<http://www.detex.com/NewsAction.jspa?id=3>>.

Dwyer et al., Abstract: "Analysis of the Performance and Emissions of Different Bus Technologies on the city of San Francisco Routes," Technical paper published by Society of Automotive Engineers, Inc. Published Oct. 26, 2004, 2 pp., NDN-116-0014-3890-6.

Contact: GCS (UK), Tewkesbury Gloucestershire, Dec. 11, 2002, 2pp. Copyright 2000 GCS General Control Systems << http://www.gcs.at?eng/newsallegemein.htm>>.

Guensler et al., "Development of a Comprehensive Vehicle Instrumentation Package for Monitoring Individual Tripmaking Behavior," Georgia Institute of Technology: School of Civil and Environmental Engineering, 31 pp., Feb. 1999.

Jenkins et al., "Real-Time Vehicle Performance Monitoring Using Wireless Networking," IASTED International Conference on Communications, Internet, and Information Technology, 375-380, Nov. 22-24, 2004.

Kurtz, J., "Indiana's E-Government: A Story Behind It's Ranking," Incontext Indiana's Workforce and Economy, Jan.-Feb. 2003, vol. 4, 5 pp. Available at <<http://www.incontext.indiana.edu/2003/janfeb03/govemement.html>>.

Kwon, W., "Networking Technologies of In-Vehicle," Seoul National University: School of electrical engineering, 44 pp., Mar. 8, 2000.

(56) References Cited

OTHER PUBLICATIONS

Leavitt, Wendy, "The Convergence Zone," FleetOwner, 4 pp., <<www.driversmag.com/ar/fleet_convergence_zone/index.html>>, Jun. 1, 1998.
"Miras GPS vehicle tracking using the Internet," Business Wire, 2 pp., Nov. 22, 1996.
Miras, "About SPS Technologies," 1 pg., May 7, 1999.
Miras, "How Miras Works," 1 pg., Apr. 29, 1999.
Miras, "Miras 4.0 Screenshot," 1 pg., May 7, 1999.
Miras, "Miras Unit," 1 pg., May 4, 1999.
Miras, "Monitoring Vehicle Functions," 1 pg., Apr. 27, 1999.
Miras, "Remote Control," 1 pg., Apr. 29, 1999.
Miras, "Tracking & Monitoring Software," 1 pg., Apr. 29, 1999.
"Nextel, Motorola and Symbol Technologies Offer First Wireless Bar Code Scanner for Mobile Phones," Jun. 11, 2003, <<http://theautochannel.com/news/2003/06/11/162927.htm>>.
Final Office Action for U.S. Appl. No. 13/157,203, dated Jan. 22, 2014, Charles Michael McQuade, "System and Method for Obtaining Competitive Pricing for Vehicle Services", 29 pages.
Non-Final Office Action for U.S. Appl. No. 13/219,467, dated Oct. 15, 2012, Greg Colvin et al., " Method and Apparatus for Remote Vehicle Diagnosis", 29 pages.
Final Office Action for U.S. Appl. No. 13/157,203, dated Feb. 12, 2014, Charles Michael McQuade, "System and Method for Obtaining Competitive Pricing for Vehicle Services", 31 pages.
Final Office Action for U.S. Appl. No. 12/956,961, dated Jun. 28, 2013, Charles Michael McQuade, "System and Method for Vehicle Maintenance Including Remote Diagnosis and Reverse Auction for Identified Repairs", 75 pages.
Office Action for U.S. Appl. No. 13/157,203, dated Jul. 30, 2013, Charles Michael McQuade, "System and Method for Obtaining Competitive Pricing for Vehicle Services", 30 pages.
Office Action for U.S. Appl. No. 12/956,961, dated Sep. 21, 2012, Charles Michael McQuade, "System and Method for Vehicle Maintenance Including Remote Diagnosis and Reverse Auction for Identified Repairs", 45 pages.
Final Office Action for U.S. Appl. No. 13/219,467, dated Sep. 25, 2013, Greg Colvin et al., " Method and Apparatus for Remote Vehicle Diagnosis", 69 pages.
"OBD Up," Motor, pp. 28-34, Jul. 1998.
PCT Search Report & Written Opinion for application No. PCT/US2011/049470, dated Feb. 9, 2012, 7 pages.
PCT Search Report & Written Opinion for application No. PCT/US2011/062480, dated Jul. 30, 2012, 9 pages.
"Private fleets moving to wireless communications," FleetOwner, 4 pages, <<www.driversmag.com/ar/fleet_private_fleets_ moving/index.html>>, May 1, 1997.
Quaan et al., "Guard tour Systems," Security Management Online, Sep. 16, 2003, 1 pg., <<http://www.securitymanagement.com/ubb/Forum30/HTML/000066.html>>.
Qualcomm, "Object FX Integrates TrackingAdvisor with Qualcomm's FleetAdvisor System; Updated Version Offers Benefit of Visual Display of Vehicles and Routes to Improve Fleet Productivity," Source: Newswire, Published Oct. 27, 2003, 4pp. NDN-121-0510-3002-5.
Senger, N., "Inside RF/ID: Carving a Niche Beyond Asset Tracking," Business Solutions, Feb. 1999, 5 pp., Available at: <<http://www. businesssolutionsmag.com/ Articles/1999 02/990208 .html>>.
Sterzbach et al., "A Mobile Vehicle On-Board Computing and Communication System," Comput. & Graphics, vol. 20, No. 4, 659-667, 1996.
"The Data Acquisition Unit Escorte," The Proxi Escort.com, Nov. 20, 2001, 4 pp., GCS General Control Systems, <<http://www.gcs.at/eng/produkte/hw/escorte.htm>>.
"The Pen Master" and "The PSION Workabout," General Control Systems, last modified Nov. 20, 2001, <<http://www.gcs.at/eng/produkte/hw/penmaster.htm>>.
Tiscor: Inspection Manager 6.0 User Guide, USA, 2004, pp. 1-73.
"Tiscor: The Mobile Software Solutions Provider," "Inspection Manager: An Introduction," Sep. 27, 2004, Slide presentation; 19 pp., Available: <<www.TISCOR.com>>.
"Tracking out of route: software helps fleets compare planned routes to actual miles. (Technology)," Commercial Carrier Journal, Published Oct. 1, 2005, 4 pp., NDN-219-1054-1717-0.
Anonymous, "Transit agency builds GIS to plan bus routes," American City & County, vol. 118, No. 4. Published Apr. 1, 2003, 4pp. NDN-258-0053-0664-6.
Tsakiri et al., Abstract: "Urban fleet monitoring with GPS and GLONASS," Journal of Navigation, vol. 51, No. 3, Published Sep. 1998, 2 pp., NDN-174-0609-4097-3.
Tuttle, J., "Digital RF/ID Enhances GPS" Proceedings of the Second Annual Wireless Symposium, pp. 406-411, Feb. 15-18, 1994, Santa Clara, CA.
Want, R., "RFID a Key to Automating Everything," Scientific American, Jan. 2004, p. 58-65.
"What is the Child Check-Mate Safety System?" 2002 Copyright, Child Checkmate Systems Inc., <<http://www.childcheckmate. com/what.html>>, retrieved on Apr. 7, 2004.
Zujkowski, Stephen, "Savi Technolgy, Inc.: Savi Security and Productivity Systems," ATA Security Forum 2002, Chicago, IL: 21 pp., May 15, 2002.
McQuade et al., "System and Method for Obtaining Competitive Pricing for Vehicle Services," Office Action, U.S. Appl. No. 13/157,203, dated Sep. 23, 2015, 34 pages.
FOLDOC, Free On-Line Dictionary of Computing, "circular buffer from FOLDOC": http://foldoc.org/circular%20buffer (Year: 2000), 2 pages.
FOLDOC, Free On-Line Dictionary of Computing, "hardware circular buffer from FOLDOC": http://foldoc.org/hardware+circular+buffer (Year: 2000), 2 pages.
FOLDOC, Free On-Line Dictionary of Computing, "stack from FOLDOC": http://foldoc.org/FILO (Year: 1995), 3 pages.
Karakehayov, Zdravko et al. "Embedded Systems Design with 8051 Microcontrollers: Hardware and Software" https://books.google.com/books?id=YiTa-HChnOUC&pg=PA186&dq=ring+buffer&hl=en&sa=X&ved=OahU KEwjd2sqVw7dAhXxm-AKHTOPCS8Q6AEIJzAA#v=onepage&q&f=false, p. 186 (Year: 1999).
Lane, Malcolm G. "Data communications software design", https://books.google.com/books?id=4PpSAAAAMAAJ&q=ring+buffer&dq=ring+buffer&hl=en&sa=X&ved=OahUKEwjvk46Kv_7dAhXqYN8KHQZNA7w4ChDoAQgtMAE, pp. 246, 247 and 249 (Year: 1985).

* cited by examiner

ZONAR

| VEHICLE MENU | DIAGNOSIS & AUCTION RESULTS | VIRTUAL GARAGE |
| --- | --- | --- |
| ZONA0039 ZONA0040 ZONA0041 ZONA0042 ZONA0043 ZONA0044 ZONA0045 ZONA0046 _ZONA0047_ ZONA0048 ZONA0049 ZONA0050 ZONA0051 ZONA0052 ZONA0053 ZONA0054 ZONA0055 | ZONA0047: REPLACE FUEL INJECTORS (6.5 HOURS LABOR) 110a<br>1. *$1835.00* ($695.00 PARTS & $1140 LABOR) 3.2 MILES 1 DAY WAIT BRETT'S TRUCK REPAIR 18300 BENSON HIGHWAY 425-888-9999  108a<br>110b<br>2. *$1855.00* ($695.00 PARTS & $1190 LABOR) 2.9 MILES NOW BILL'S DIESEL SERVICE 21400 68TH AVE S 425-999-8888  108b<br>110c<br>3. *$1935.00* ($745.00 PARTS & $1190 LABOR) 4.5 MILES 2 DAY WAIT MCQUADE'S TRUCK SERVICE 1900 S 144TH ST. 425-989-8989  108c | SERVICE VENDOR & VEHICLE LOCATION |

*FIG. 5*

SYSTEM AND METHOD FOR OBTAINING COMPETITIVE PRICING FOR VEHICLE SERVICES

This application is a continuation-in-part of a copending patent application Ser. No. 12/956,961, filed on Nov. 30, 2010, the benefit of the filing date of which is hereby claimed under 35 U.S.C. § 120.

BACKGROUND

Vehicle owners, including individual consumers and fleet operators, have many choices for acquiring services for their vehicles. Such services can include, but are not limited to, routine maintenance, diagnosis and repair of fault conditions, and replacement of consumable items, such as engine oil, coolant, brakes and tires. Selecting an appropriate vendor is often a time consuming endeavor.

Particularly with respect to the diagnosis or detection of fault conditions, today's vehicles are equipped with many different types of data collection and processing components, and such data can be useful in diagnosing specific vehicle problems.

Much of the data collected by the data collection components is used to control the operation of the vehicle. For example, data collected by oxygen sensors is used to control the amount of fuel introduced into the engine, to avoid providing an overly rich fuel mixture that would result in decreased fuel efficiency and increased emissions.

Two broad classes of vehicle performance data include operational data and fault code data. Operational data encompasses data that is used to control the operation of the vehicle, such as the data from oxygen sensors, as noted above. In general, operational data is not stored, but rather generated, contemporaneously used as necessary to control various vehicular systems (such as a fuel injection system, a cooling system, and/or a braking system), and then discarded. Exemplary operational data include, but is not limited to, engine coolant temperature, engine speed, oxygen levels, throttle position, brake temperature, vehicle speed, brake position, and gearbox parameters. Much of this data is collected very frequently. Indeed, some types of operational data are collected multiple times per second. The sheer quantity of operational data being generated makes storing or archiving all of the operational data problematical. Some vendors do provide data logging systems for temporary use in vehicles, where all the operational data generated by the vehicle is stored, but such data logging systems are not designed for long term use.

Fault code data addresses the problem of storing the enormous quantity of operational data generated by vehicles. Fault codes corresponding to specific undesirable operating parameters are predefined. A processor in the vehicle monitors the operational data as it is generated, and whenever an operating parameter corresponding to a specific predefined fault code is detected, indicating that a fault has occurred, the fault code is stored in a memory in the vehicle. The fault code is generally a numeric or alphanumeric value that can be stored using minimal memory resources. For example, the number 11 can be defined as a fault code for a specific condition, such as sensing that the battery voltage has dropped below 4 volts or has remained between 7 and 8 volts for more than 20 seconds. Fault codes can be retrieved from memory and used to diagnose vehicle problems. However, even when thus accessing fault codes, accurate diagnosis of other than routine vehicular system failures can be problematical.

In addition to fully automated vehicle monitoring and data collection, additional data derived from manual vehicle inspections and operator experience while driving a vehicle can be collected in an automated fashion. Such data can be provided by a person visually observing the condition of components on a vehicle either during routine inspections or simply while near the vehicle, but can also be based upon the driving feel and sensation experienced by an operator while using the vehicle. The data can readily be input using a handheld data collection device such as disclosed in commonly assigned U.S. Pat. Nos. 6,671,646; 6,804,626; 7,557,696; and 7,117,121. For example, during a safety inspection of a vehicle or while walking by the vehicle, the operator may note that one or more tires are worn and may require replacement. Entry of data indicating such conditions into a portable data collection device, as described in the above noted patents readily facilitates the electronic transfer of the data to a remote facility. And, as noted above, conditions related to the status of the vehicle may be observed by an operator while the vehicle is being driven. For example, an operator may note that the brakes are starting to chatter when lightly depressed, indicating either that a brake rotor is warped or that the brake pads are worn and need to be replaced. The operator can input the observation about the brakes chattering into a data terminal for upload to a remote site, which can then determine the type of repair that is needed to correct the problem or schedule the more detailed mechanical inspection of the vehicle to determine the actual source of the problem.

Conventionally, the service shop that is selected to repair a vehicle or further diagnose problems observed by an operator is selected either based on past knowledge of the service shop vendor, or by referral from someone who has experience with the service shop, or by randomly selecting a service vendor from a list such as provided in the yellow page listing or on the Internet. While an operator or owner of a vehicle may call to inquire about repair estimates, the decision to use a specific repair service vendor is often based on incomplete data and may not represent the best choice from the available repair service vendors near a desired location for the repair or maintenance.

Accordingly, regardless of the types of data used to facilitate a diagnosis of vehicle problems, the vehicle operator or owner would benefit from being provided with a more complete list of the suitable and cost effective repair facilities available near a location to perform the required servicing. It would also be desirable to provide the operator of the vehicle with the cost charged by each such repair service vendor for performing the required repair or maintenance. Further, it would be desirable to obtain the lowest costs at which each such vendor is willing to perform the repair task. It would also be desirable to provide vehicle operators with well defined service needs (new tires, oils changes, etc.) with similar information on suitable vendors.

For those cases in which the vehicle operator may not know the actual type of repair that is required for a vehicle, it would be desirable to provide a vehicular diagnostic service for vehicle operators that provides the vehicle operators with information defining the required repair. This information could thus be used to create the list of the repair service vendors willing and able to promptly perform that repair, along with the costs for each specific vendor to complete the repair.

SUMMARY

This application specifically incorporates herein by reference, the disclosures and drawings of the patents identified above.

The concepts disclosed herein encompass determining the service needs of a particular vehicle, contacting a plurality of suitable vendors to obtain pricing data for the service, and providing the operator of the vehicle with the pricing data obtained from the vendors. In at least some embodiments, one or more of the following types of additional information for each vendor will be provided along with the pricing data, to enable the consumer (the owner or operator of the vehicle) to make an informed selection: a rating of the vendor, a relative distance between the consumer (or known vehicle location) and the vendor, and a time period defining when the vendor will be able to accommodate the service. In at least some embodiments, a pricing service provider hosts a reverse auction for the benefit of the consumer. In at least some embodiments, the pricing service provider hosts a webpage upon which results of the service requests from the plurality of vendors are displayed.

In some circumstances, the consumer will know exactly what services are required. For example, a particular consumer may need new tires for their vehicle, or may need their oil changed. In embodiments directed to serving that need, the consumer conveys a service request that specifically defines the required service to the pricing service provider, who in turn conveys the specific, well defined service request to the plurality of vendors, to obtain pricing data for the consumer.

In some circumstances, the consumer may understand there is a problem with the vehicle, but may not know exactly what service is required. The concepts disclosed herein encompass embodiments in which the pricing service provider acquires vehicle performance data from the specific vehicle, and that vehicle performance data is used to determine the specific service that is required. The diagnosis of the vehicle performance data can be performed by a third party, by the pricing service provider, or by each vendor providing a price quote, as well as combinations and permutations thereof. In some embodiments, the vehicle performance data is acquired by the consumer and conveyed to the pricing service provider along with a request for service. Low cost diagnostic units capable of extracting fault code data and other vehicle performance data from vehicles are increasingly available. In at least one embodiment disclosed herein, individual consumers use such equipment to transfer vehicle performance data to their smart phones, and such data is then conveyed to the pricing service provider. Vehicle manufactures are also increasingly collecting and storing vehicle performance data from vehicles they manufacture and sell. Manufactures such as General Motors, Ford, and Hyundai each have varying abilities to collect vehicle performance data. The concepts disclosed herein encompass conveying vehicle performance data collected by such third parties to a pricing service provider to be used for the purpose of acquiring pricing information for the required service. There also exist vendors who install after market data collection components in vehicles (such data collection components are often integrated into position tracking components), and the concepts disclosed herein encompass conveying vehicle performance data collected by such monitoring service vendors to the pricing service provider to be used for the purpose of acquiring pricing information for the required service. In at least one embodiment, the pricing service provider also collects and archives vehicle performance data collected from the vehicle on a regular basis (thus, the monitoring service and the pricing service provider are the same entity).

The concepts disclosed herein also encompass embodiments where the consumer does not yet know that their vehicle requires service, but a third party who collects and monitors vehicle performance data collected from the consumer's vehicle on a regular basis detects a problem with the vehicle (a current fault condition or a developing fault condition) by analyzing the vehicle performance data collected from the consumer's vehicle. The third party then contacts the pricing service provider (noting that in some embodiments the monitoring party and the pricing service provider are the same entity) for obtaining pricing data for the required service. As discussed above, the pricing service provider collects pricing data from a plurality of vendors, and then conveys that pricing data either directly to the vehicle operator, or to the third party monitoring service, who in turn contacts the vehicle operator.

Thus, in at least some embodiments, data is collected from a vehicle and used to diagnose any mechanical or electrical problems with the vehicle, quotes for the required repair are acquired from a plurality of vendors, and the pricing data is provided to the operator of the vehicle. In at least one embodiment, the repair costs are determined in a reverse auction, where vendors compete for the opportunity to repair the diagnosed problem by making bids for the costs that will be incurred if they provide the required service; however, it will be understood that non-binding repair quotes can alternatively be solicited from repair vendors who are interested in repairing the vehicle. A reverse auction is a type of auction in which the roles of buyers and sellers are reversed. In an ordinary auction (also known as a forward auction), buyers compete to obtain a good or service, and the price typically increases over time. In a reverse auction, sellers compete to obtain business, and prices typically decrease over time. It should be understood that the reverse auction embodiment is not limited to embodiments where vehicle performance data is used to diagnose the service needed, but that the reverse auction technique can also be applied to embodiments where the consumer knows what service is required (i.e., new tires, an oil change, or the repair of a previously diagnosed condition).

In at least one embodiment, the vehicle operator signs up with a vendor for a vehicle monitoring service (noting that the monitoring service may be part of the purchase price of the vehicle). The monitoring service vendor collects performance data from the operator's vehicle on an ongoing basis. The monitoring service vendor monitors the performance data, looking for any indication in the performance data of an existing or developing fault condition. Once a mechanical or other failure is detected or predicted, the monitoring service vendor contacts the pricing service provider (i.e., the entity who requests and obtains service quotes from service vendors), who contacts providers of vehicle repair services and requests bids for the required repair. Vendors interested in repairing the vehicle can then submit non-binding or binding quotes for the cost to complete the job, which in some exemplary embodiments, may be broken down in terms of labor and parts costs. In at least one embodiment, the bids are requested in a reverse auction style format, where the vehicle repair providers bid on the job, which tends to reduce the costs bid by successive bidders. The pricing service vendor then makes the diagnosis and the reverse auction bid results available to the vehicle operator, the monitoring service vendor, or both. As noted above, in some embodiments the vehicle monitoring service and the pricing service provider are the same entity, although it should be recognized that the concepts disclosed herein also specifically encompass embodiments in which the vehicle monitoring service and the pricing service provider are different entities.

It should be noted that as used herein, unless otherwise evident, the terms "operator" and "vehicle operator" are intended to encompass the party actually operating a vehicle, as well as the owner of the vehicle, and/or the person or persons responsible for ensuring that vehicles are maintained. For example, a fleet of vehicles may be owned by a person, a company, or a corporate entity, and each of these entities is encompassed by the term vehicle owner and/or vehicle operator. Also, the owner may employ one or more other persons to be responsible for ensuring that the vehicles are repaired or maintained using a vehicle repair vendor selected by that person or by the owner, and such one or more other persons are also encompassed by the terms operator and/or vehicle operator. The term consumer is used refer to the party requesting the pricing data from the pricing service provider, who can be the vehicle operator and/or the monitoring service.

In some embodiments, the pricing service provider charges vehicle operators a subscription fee (the pricing service may be bundled with additional services, including but not limiting to the monitoring service discussed above). In some embodiments, the pricing service provider charges the service facility that wins the reverse auction (or whose non-binding or binding quote is selected) and provides the repair service a fee. It should also be understood that a third party may be tasked with carrying out the reverse auction on behalf the vehicle owner, and/or the monitoring service. The fee to the repair facility may be a flat fee or a percentage of the repair costs.

In some embodiments, the diagnosis data and the reverse auction data are available to vehicle operators and providers of vehicle repair services over the Internet. In at least one embodiment, the pricing service provider hosts a website that is accessible to vehicle operators and (in some embodiments) providers of vehicle repair services. In at least one embodiment, the pricing service provider prequalifies providers of vehicle repair services, to ensure that each provider participating in the reverse auction is qualified to perform the requested repair. In at least one embodiment, the vehicle monitoring service vendor and/or pricing service provider prequalifies vehicle operators, to ensure that vehicle operator is able to pay for the requested repair. In at least one embodiment, the requested repair must be scheduled through the vehicle monitoring service vendor and/or pricing service provider, to prevent providers of vehicle repair services and vehicle operators, introduced through the vehicle monitoring service vendor or pricing service provider, from making side agreements for the requested repair that deny the vehicle monitoring service vendor/pricing service provider a fee earned for facilitating the transaction between the service vendor and the vehicle operator. In at least one embodiment, the vehicle monitoring service pays the repair vendor, and bills the vehicle operator. The vehicle monitoring service may also pay the pricing service provider to conduct the reverse auctions. In at least one embodiment, the pricing service provider pays the repair vendor, and bills the vehicle operator or the vehicle monitoring service.

In at least one embodiment, the location of the vehicle varies over time, and the pricing service provider prequalifies providers of vehicle repair services according to the current location of the operator's vehicle (i.e., providers of vehicle repair services who are located beyond a predefined distance are not allowed to bid in the reverse auction). The pricing service provider will have access to that information when the pricing service provider and the monitoring service are the same entity. Where the pricing service provider and the monitoring service are not the same entity, the pricing service provider can obtain the vehicle location from the monitoring service, and/or the vehicle operator. In at least one embodiment, vehicle operators can define, or redefine, the predefined distance. In at least one embodiment, vehicle operators can define a desired location for the repair (for example, a vehicle may be en route to a specific destination, and the vehicle operator can define that destination so that repair costs from vendors at the destination can bid on the repair). The current location of the vehicle may be determined by a GPS receiver disposed on the vehicle and will then enable the current location of the vehicle to be the basis for determining the desired location for the repair to be carried out.

Clearly, for certain critical types of repair in which a vehicle is not operative or should not be operated any longer than necessary for safety considerations, the current location will be appropriately the desired location for the repair. However, other types of vehicle faults and conditions that are diagnosed will be for less critical repairs that can be deferred until the vehicle is at a different location in its route, or has returned to its home base. The vehicle monitoring service will be aware of the current location and can have access to the route information of each vehicle it is monitoring, so it will be able to determine the desired location based on that information and the type and criticality of the repair to be performed. In at least one embodiment, the operator of the vehicle can communicate with the vehicle monitoring service or pricing service provider to advise of the vehicle's planned route or to make changes in a predefined route.

In some embodiments, the vehicle monitoring service vendor collects data from enrolled vehicles in real-time. In some embodiments, the vehicle monitoring service vendor collects fault code data from enrolled vehicles, and uses the fault code data to monitor the vehicle, and determine if a repair is required. In a particularly preferred embodiment, the vehicle monitoring service vendor collects fault code data and non-fault code based performance from enrolled vehicles in real-time, and uses the fault code data and the performance data to monitor the vehicle, and determine if a repair is required. In at least one embodiment, the amount of performance data collected increases when a fault code is detected. In some exemplary embodiments, the vehicle may alert the operator of a problem requiring repair with a warning on the instrument panel in the vehicle. The operator can then transmit a request for automatically obtaining quotes to complete the repair from interested service vendors to the monitoring service, which can respond (or use a third party) to obtain the quotes or conduct a reverse auction to determine the costs for each interested service vendor to complete the desired repair. In some exemplary embodiments, the operator can select a desired service vendor to complete the repair from among the quotes submitted by the service vendors interested in doing the repair work, or from the bids provided by the service vendors participating in the reverse auction.

In at least one embodiment, the information about the vehicle provided to the repair vendors is sufficiently detailed such that repair vendors can feel confident of the services required, so that such repair vendors will be able to more aggressively compete for business (i.e., the repair vendors will feel more confident in offering their lowest possible price for the repair, without being concerned that the diagnosis is too vague to enable their best price to be offered).

In some embodiments, the data provided to the repair vendors will be from a recognized diagnostic software application known to repair vendors, who have come to trust the results provided by such an application. Such diagnostic software applications use many types of data (including but not limited to fault code data, vehicle sensor data, the vehicle identification number (VIN), the firmware version of the vehicle computer, details about the specific transmission with which the vehicle is equipped, and details about the specific engine with which the vehicle is equipped) to arrive at a detailed diagnosis. In some embodiments, the monitoring service will input the required data in a diagnostic package of their own choosing, while in other embodiments the monitoring service will forward the raw data to the repair vendors who will input the required data in a diagnostic package of the repair vendor's choosing. Using a well known or trusted diagnostic software application will likely encourage repair vendors to provide better pricing. Vendors such as Navistar, Detroit Diesel, and Snap-on Tools offer such diagnostic software applications.

It should be understood that the concepts disclosed herein can be combined with many types of data collection strategies. In at least one embodiment, the vehicle is configured to transmit data to the remote server at various intervals, and at each interval, the vehicle will transmit data including position data and vehicle performance data to the remote server (however, the concepts disclosed herein also encompass embodiments where performance data is transmitted without position data). The quantity of performance data to be transmitted can be varied. The more performance data that is conveyed from the vehicle to the remote server operated by the monitoring service, the more likely the remote server will be able to accurately identify mechanical faults. However, as the volume of performance data transmitted from the vehicle to the remote server increases, the required computing resources increases, and transmission related costs can increase. Thus, the artisan of skill will recognize that tradeoffs exist in determining how much performance data to convey from the vehicle to the remote server. In at least one embodiment, a relatively small amount of performance data is transmitted to the remote server at each transmission interval. The type of data transmitted at each interval can be varied (for example, injector data is included in a first transmission, oxygen sensor data is included in a second transmission, brake sensor data is included in a third transmission, and so on until many different types of performance data are conveyed to the remote server over time). In at least some embodiments, the remote server is configured to request specific types of performance data (i.e., data from specific sensors) to aid in identifying a particular mechanical fault.

With respect to data transmissions from the vehicle to the remote server, in at least one embodiment the vehicle transmits data to the remote server each time the vehicle changes heading. In at least one embodiment, the vehicle transmits data to the remote server at predefined time intervals. In at least one embodiment, the vehicle transmits data to the remote server each time a fault code is generated in the vehicle. In at least one embodiment, the vehicle transmits data to the remote server each time a vehicle sensor acquires a reading that varies from a predetermined threshold, even if no fault code is generated. In at least one embodiment, the vehicle transmits position data to the remote server each time performance data or fault code data is conveyed to the remote server. Also, in at least one exemplary embodiment, the performance data and fault code data are conveyed to the remote server immediately upon being generated by the vehicle's system and without being logged based on priority, although it is contemplated that other approaches might be used, such as time schedules or type of fault code being used to determine when the data are transmitted.

The methods disclosed herein are preferably implemented by a processor (such as a computing device implementing machine instructions to implement the specific functions noted above) or a custom circuit (such as an application specific integrated circuit). Further, the concepts disclosed herein also encompasses machine instructions stored on a non-transitory memory medium, which when executed by a processor implement one or more of the methods disclosed herein, and systems for implementing the disclosed methods. In one exemplary system, the basic elements include a computing device remote from the vehicle that implements the functions of monitoring the performance data from the vehicle to identify a fault, automatically contacting vendors to acquire repair costs (either through a reverse auction or simple price request), and automatically contacting the vehicle operator (either the driver or a fleet manager) to inform the operator of the fault and the repair costs/repair options. It should be understood that the term computing device encompasses computing environments including multiple processors and memory storage devices, where certain functions are implemented on different ones of the multiple processors. Thus, the term computing device not only encompasses single desktop and laptop computers, but also networked computers, including servers and clients, in private networks or as part of the Internet. The data being processed can be stored by one element in such a network, retrieved for review by another element in the network, and analyzed by yet another element in the network.

The term real-time as used herein and the claims that follow is not intended to imply the data is transmitted instantaneously, rather the data is collected over a relatively short period of time (over a period of seconds or minutes), and transmitted to the remote computing device on an ongoing basis, as opposed to storing the data at the vehicle for an extended period of time (hour or days), and transmitting an extended data set to the remote computing device after the data set has been collected.

In at least one exemplary embodiment, a vehicle operator can access the reverse auction network (i.e., the pricing service provider discussed above) using a hand held portable computing device, such as a smart phone. While many of the embodiments discussed above have emphasized vehicle fleet operators, the smart phone embodiment specifically is intended to encompass individual consumers seeking to obtain repair services for their personal vehicles (although fleet operators may also choose to utilize such an embodiment). The smart phone embodiment specifically includes the ability to have the vehicle operator use the smart phone to convey information regarding the requested service to the pricing service provider (or in some embodiments, to a vehicle monitoring service, if no consumer/vendor relationship exists between the consumer and the pricing service provider, but such a relationship exists between the consumer and the vehicle monitoring service). In some related embodiments, the consumer uses their smart phone to access a reverse auction network hosted by the pricing service provider. This embodiment enables the services of the pricing service provider to be accessible to vehicle owners whose vehicles are not equipped to send vehicle data to a vehicle monitoring service. It should be understood that the smart phone embodiment also encompasses vehicles that are equipped to send vehicle performance data to a vehicle monitoring service, generally as discussed above. Due to the limitations of the displays and processing power available to smart phones relative to desktop and laptop computers, the vehicle monitoring service and/or pricing service provider can provide pricing data and service vendor information to the consumer in a format suitable for display on smaller screens. The smart phone embodiment specifically encompasses embodiments in which the consumer specifically defines the desired service (and no vehicle performance data is included in the pricing request), as well as embodiments where the smart phone user includes vehicle performance data they extract from their vehicle.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 1A:
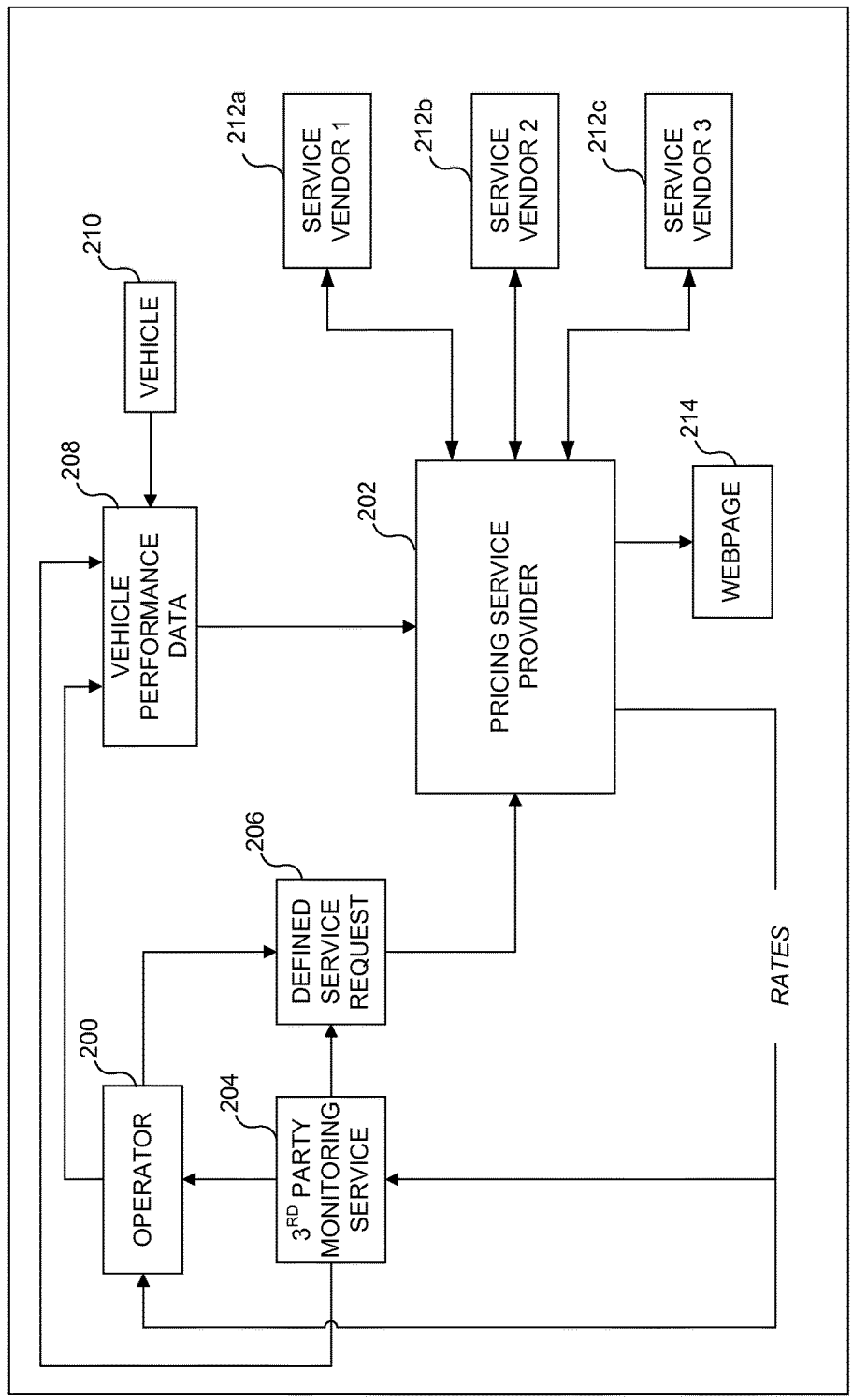
FIG. 1A is a high level functional block diagram illustrating the various inputs that can be received by a pricing service provider, who in response to an input will send a pricing request to a plurality of service vendors.
Figure 1B:
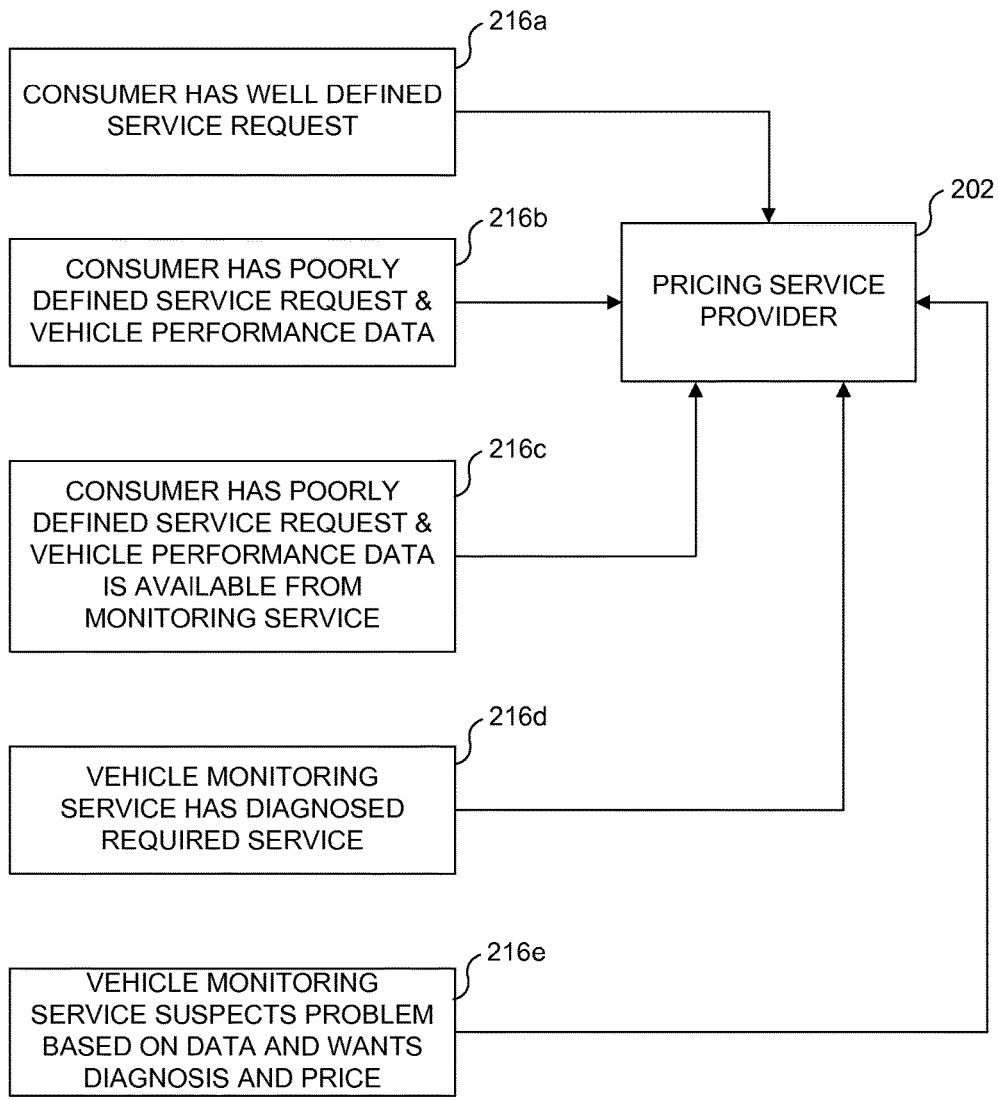
FIG. 1B is a high level functional block diagram providing greater detail about the various inputs that can be received by the pricing service provider of FIG. 1A.
Figure 1C:
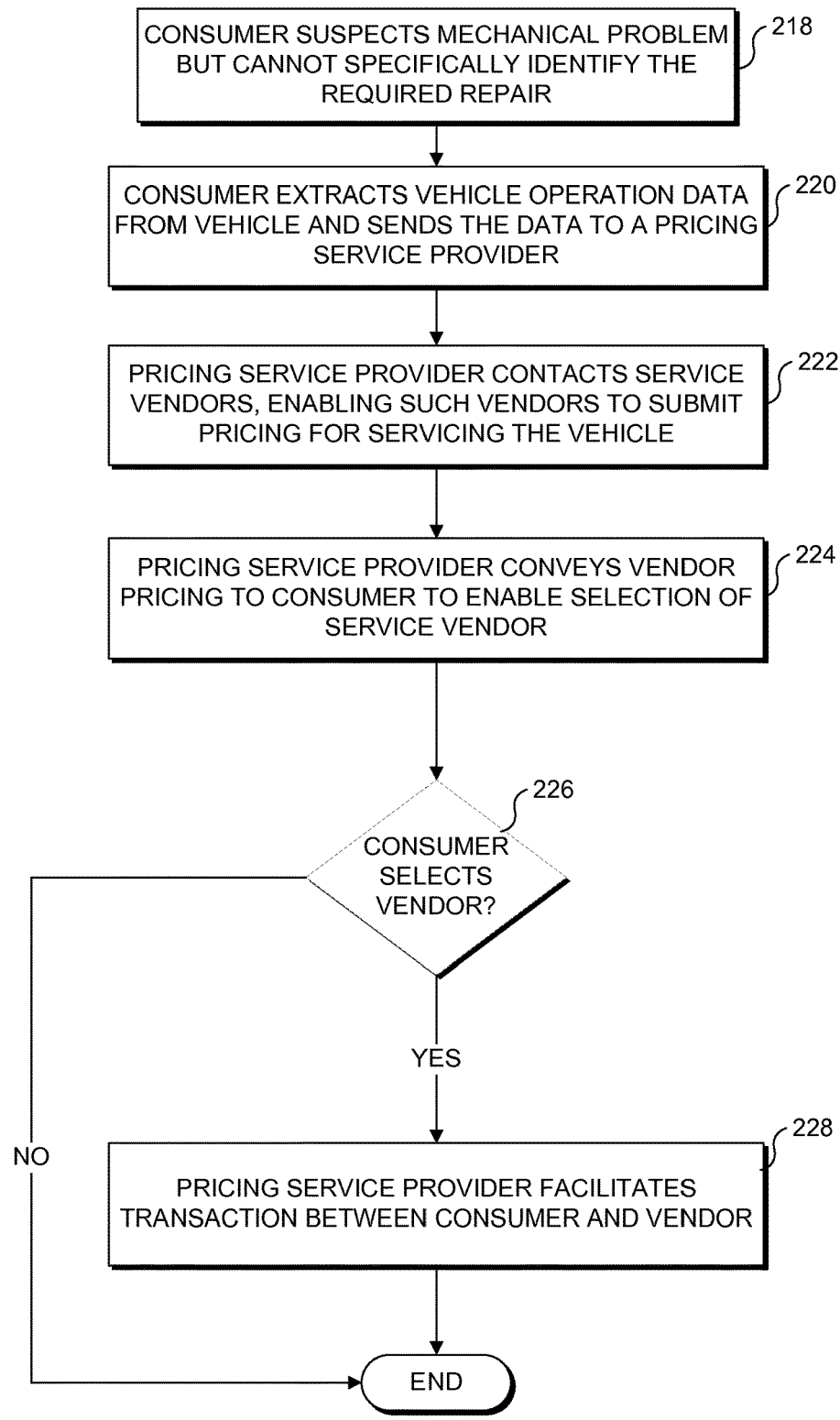
FIG. 1C is a high level flow chart showing the overall method steps implemented in accord with one aspect of the concepts disclosed herein, where a consumer suspects that a specific vehicle needs servicing, but does not understand what specific service is required, and that consumer wants a pricing service provider to obtain pricing data for the vehicle service.
Figure 1D:
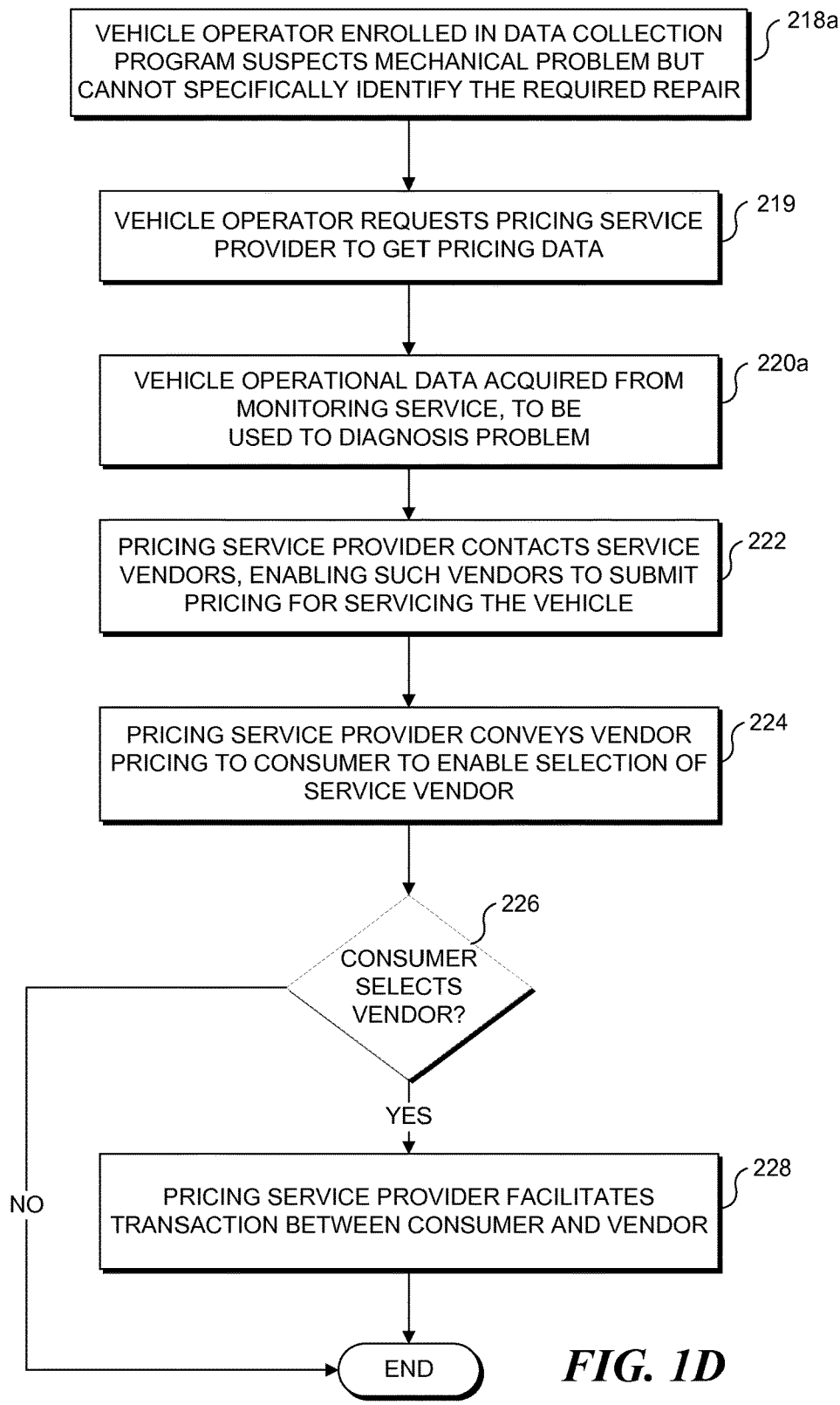
Figure 1E:
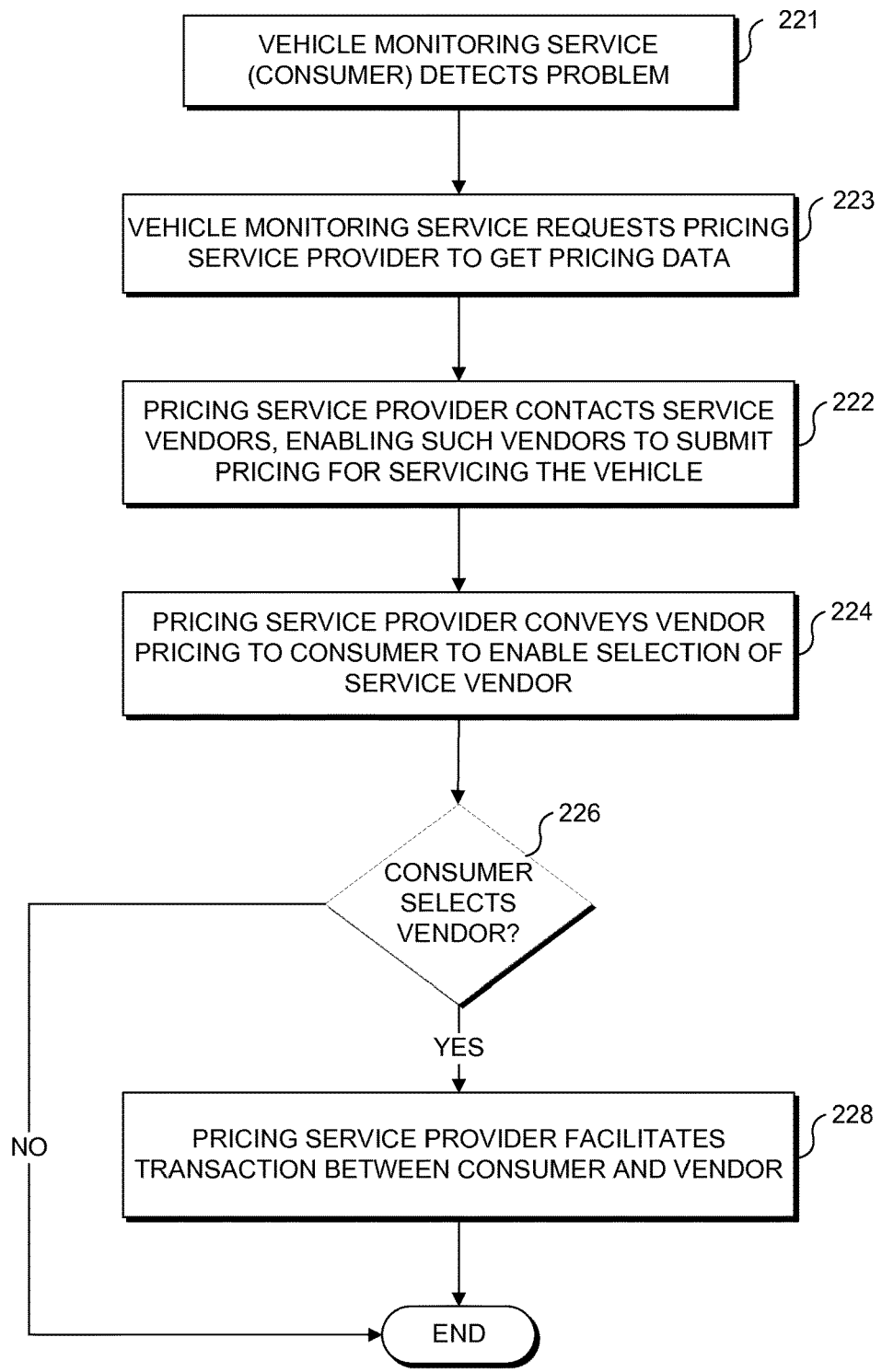
Figure 1F:
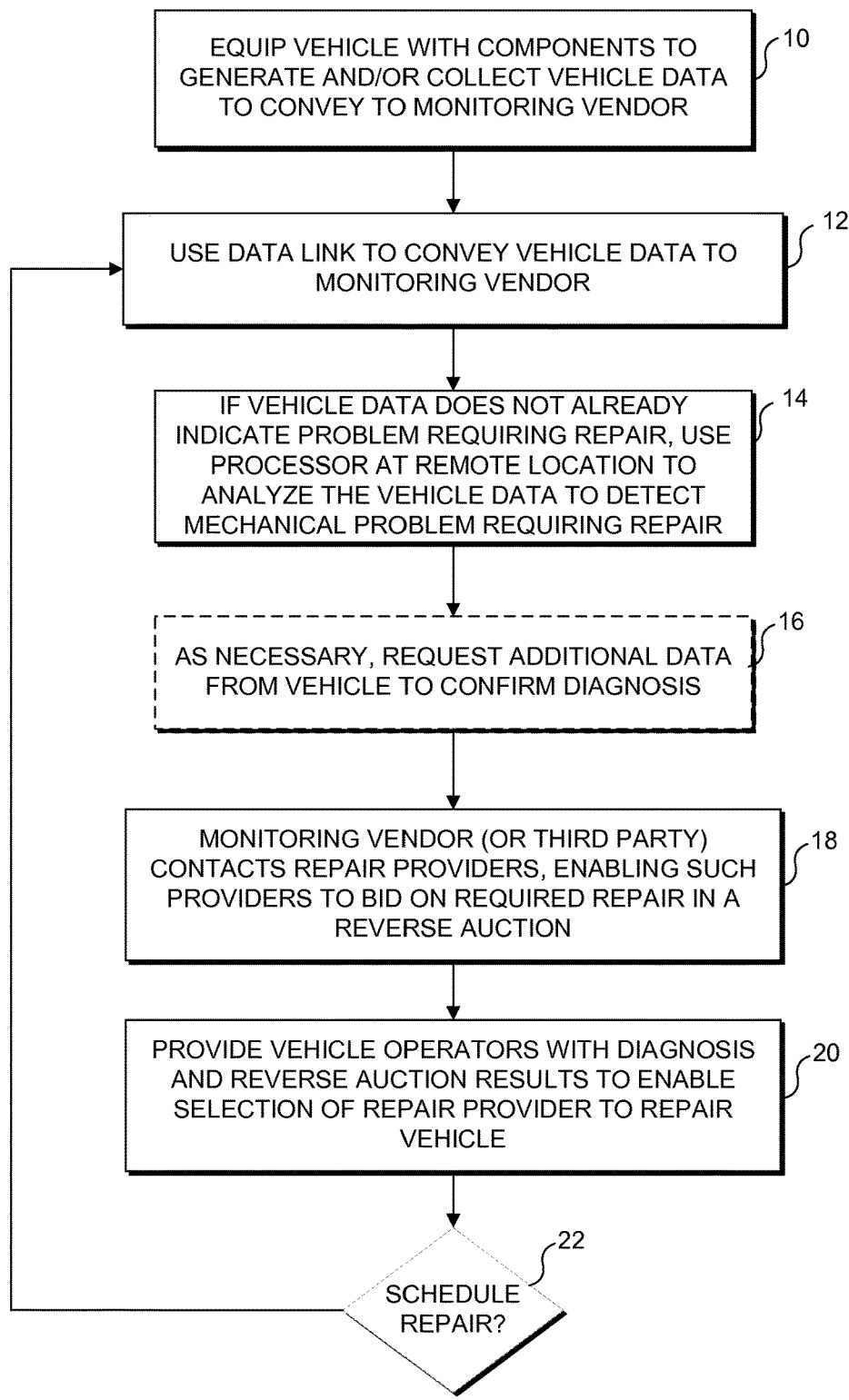
Figure 2:
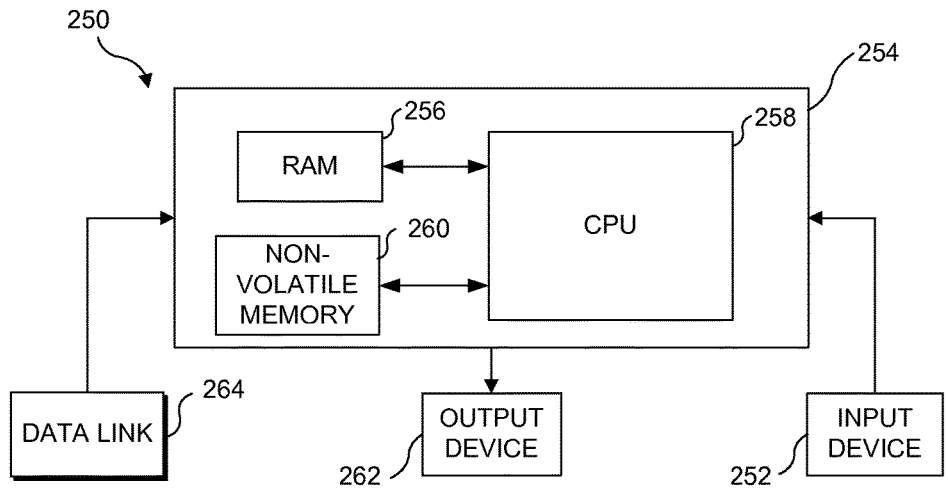
Figure 3:
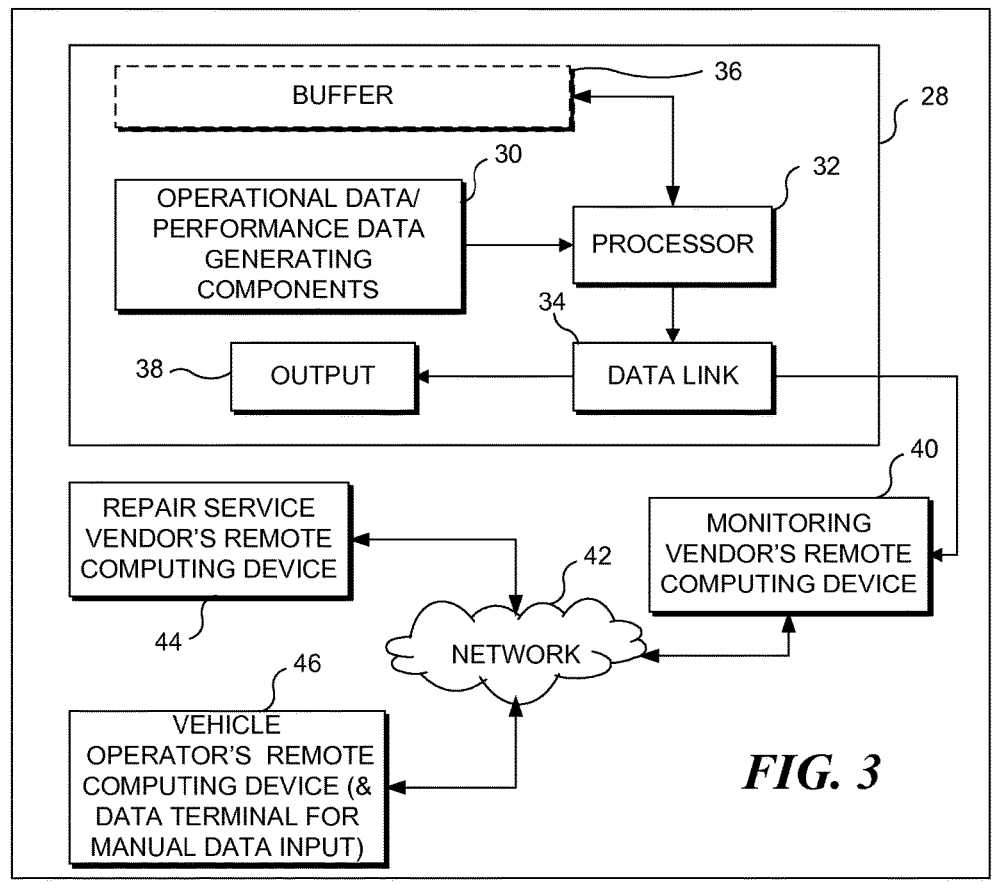
Figure 4:
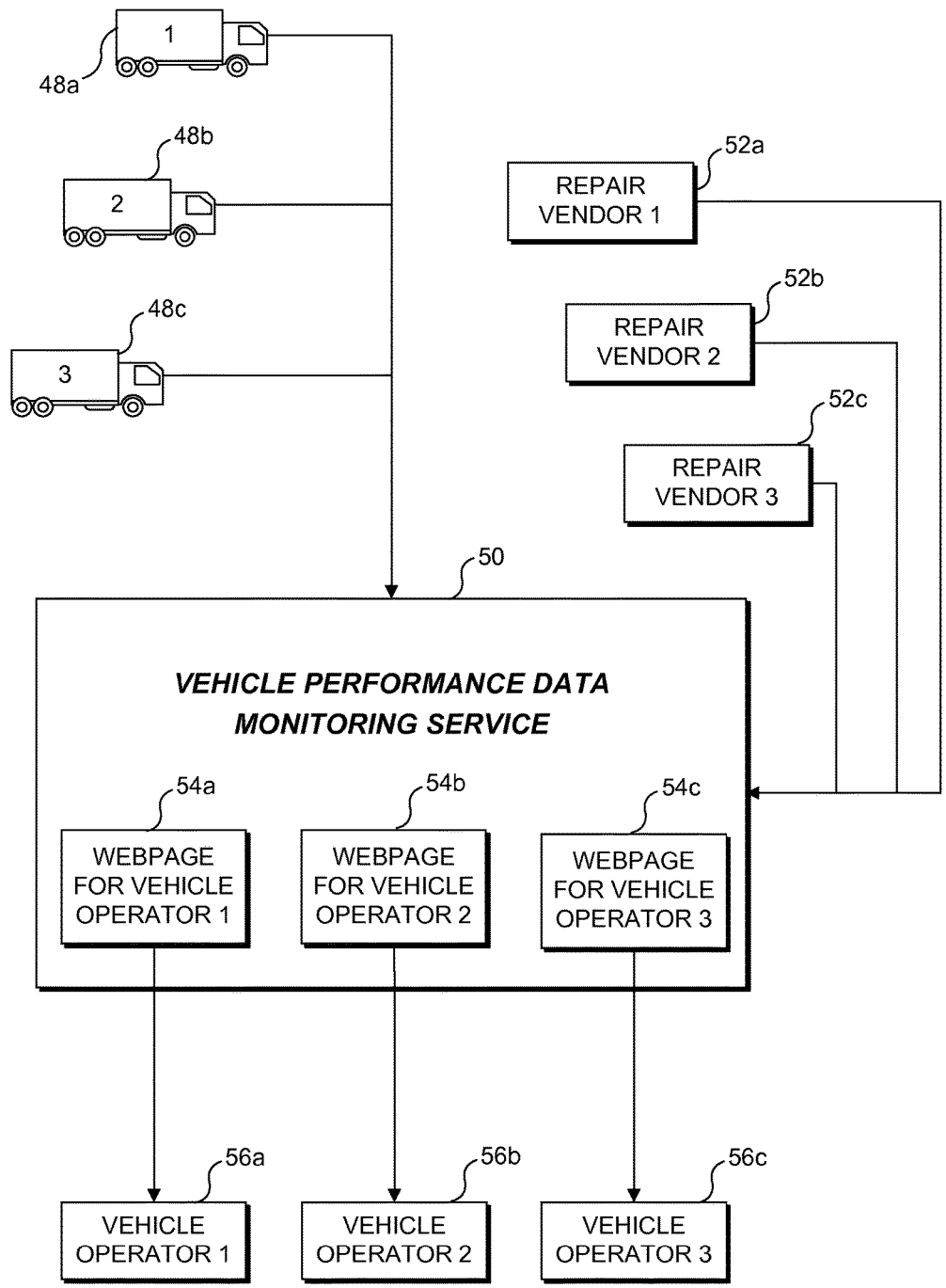
Figure 6:
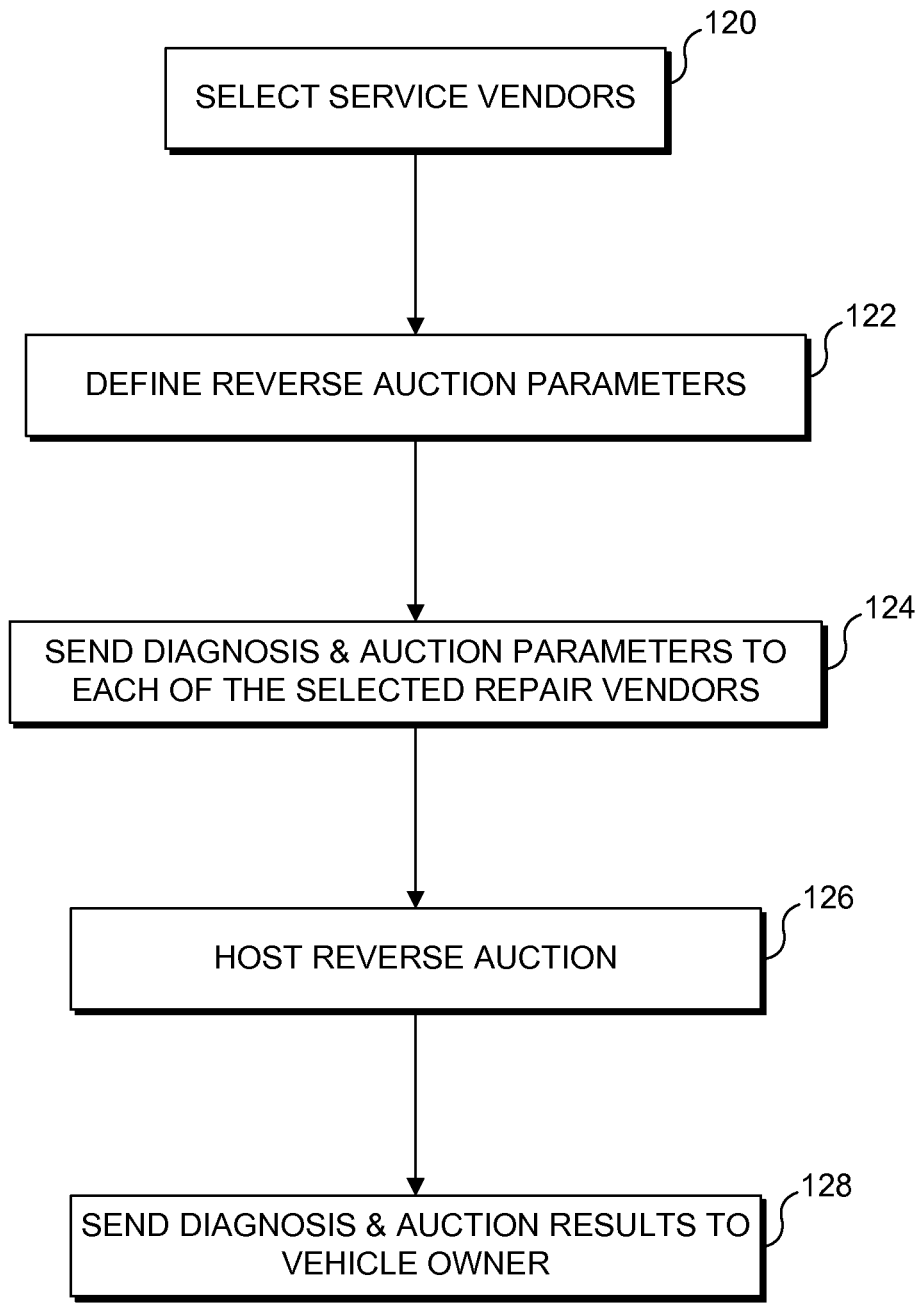
Figure 7:
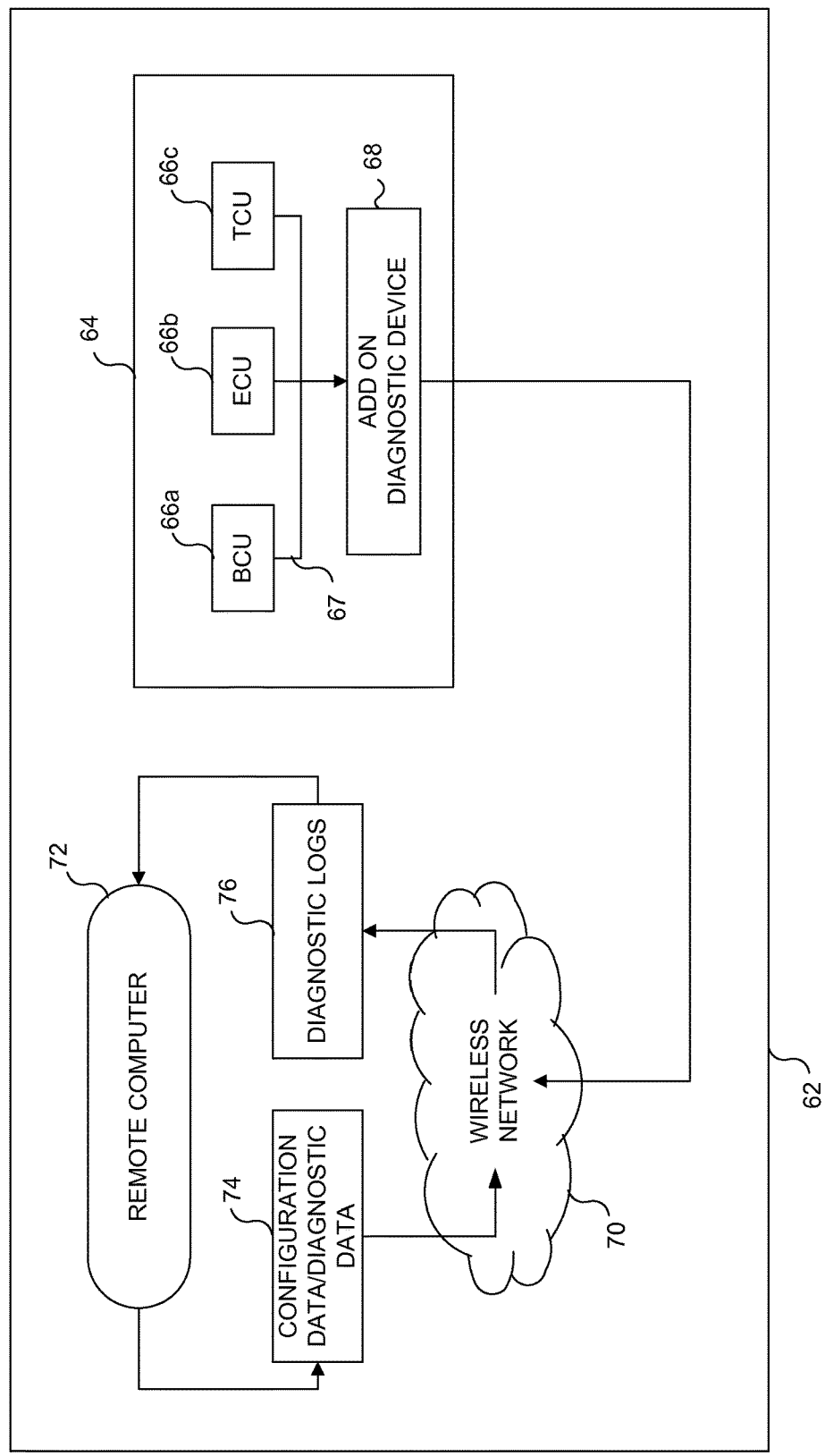
Figure 8:
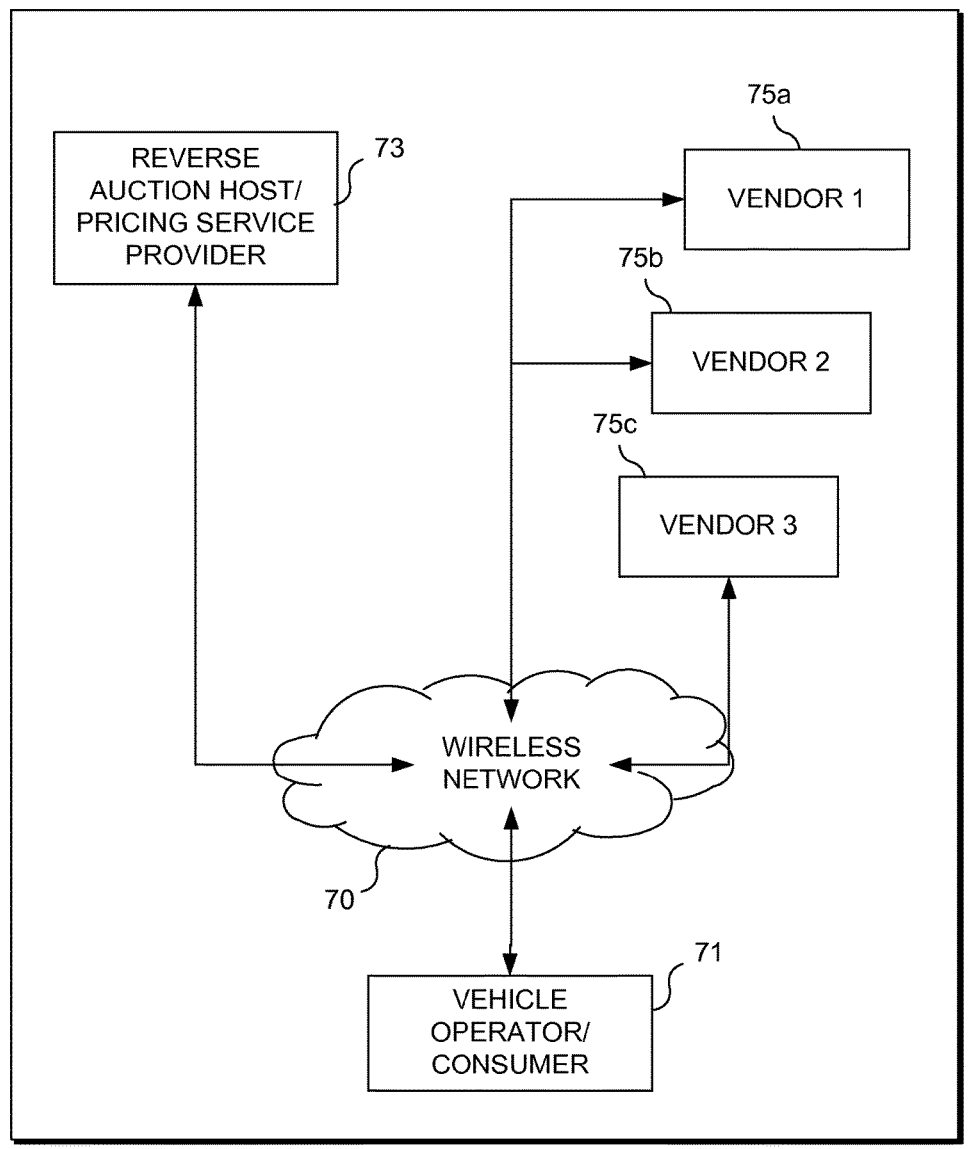
Figure 9:
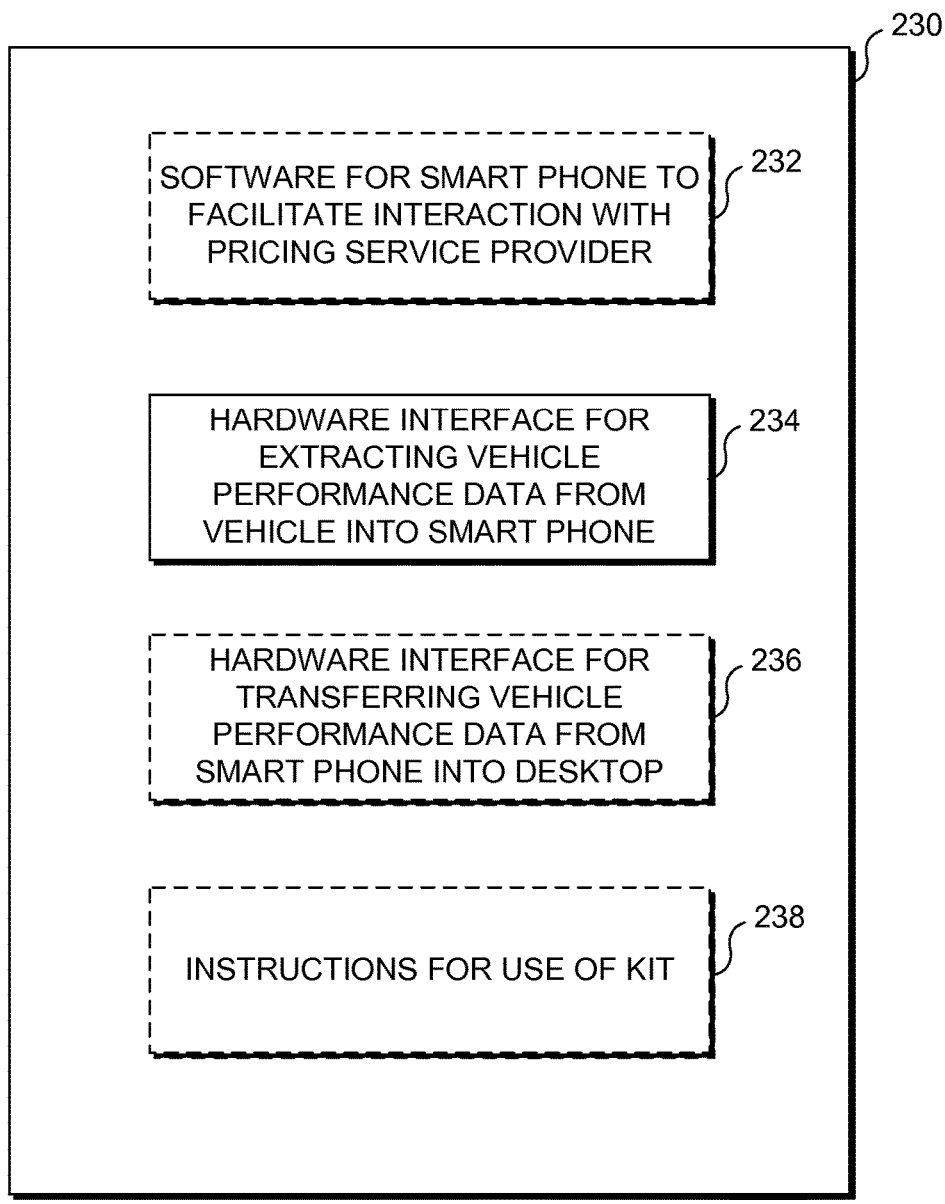

FIG. 1D is a high level flow chart showing the overall method steps implemented in accord with one aspect of the concepts disclosed herein, where a consumer enrolled in a monitoring service (the monitoring service collecting and storing vehicle performance data for the consumer's vehicle) suspects that a specific vehicle needs servicing, but does not understand what specific service is required, and that consumer wants a pricing service provider to obtain pricing data for the vehicle service;

FIG. 1E is a high level flow chart showing the overall method steps implemented in accord with one aspect of the concepts disclosed herein, where a monitoring service collecting and storing vehicle performance data for a client's vehicle is the consumer from the standpoint of the pricing service provider, and the monitoring service suspects that their client's vehicle needs servicing based on the vehicle performance data they monitor;

FIG. 1F is a high level logic diagram showing exemplary overall method steps implemented in accord with the concepts disclosed herein to remotely monitor a vehicle using data collected during normal vehicle operations, to use the collected data to diagnose an abnormal vehicle parameter in real-time, and to provide reverse auction results for the diagnosed repair to the vehicle operator;

FIG. 2 is a functional block diagram of an exemplary computing device that can be employed to implement some of the method steps disclosed herein;

FIG. 3 is a functional block diagram of an exemplary system employed to implement some of the concepts disclosed herein;

FIG. 4 is an exemplary functional block diagram showing the basic functional components used to implement the method steps of FIG. 1;

FIG. 5 is an exemplary screen shot of a webpage accessed by a vehicle operator to review the results of the reverse auction for a specific vehicle;

FIG. 6 is a high level logic diagram showing exemplary overall method steps implemented in accord with the concepts disclosed herein to host a reverse auction for a vehicular service;

FIG. 7 is another exemplary functional block diagram showing the basic functional components used to implement the method steps of FIG. 1F, where the performance data includes buffered operation data and fault codes;

FIG. 8 is a functional block diagram showing a pricing service provider, a consumer, and a plurality of service vendors interacting over the Internet; and FIG. 9 schematically illustrates an exemplary kit, designed to facilitate an interaction between a smart phone user and a pricing service provider.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

As used herein and in the claims that follow, a reference to an activity that occurs in real-time is intended to refer not only to an activity that occurs with no delay, but also to an activity that occurs with a relatively short delay (i.e., a delay or lag period of seconds or minutes, but with less than an hour of lag time).

The concepts disclosed herein encompass several different embodiments for providing consumers with pricing information for servicing a vehicle. The concepts disclosed herein encompass embodiments in which a consumer (who can be a private individual, a fleet operator, and/or a monitoring service) contacts a pricing service provider and requests pricing information for a vehicle service, as well as embodiments in which the pricing service provider monitors vehicle performance data to determine that vehicle servicing is required (which in some cases may occur before the consumer recognizes that service is required). Once the pricing service provider determines that service is required (either based on a request for service from a consumer, or an analysis of vehicle performance data, or a combination thereof), the pricing service provider contacts a plurality of vendors to acquire pricing data for performing the requested service. In at least some embodiments, the pricing service provider hosts a reverse auction, in which interested service vendors compete with one another for the service job. In at least some embodiments, the pricing service provider hosts a webpage upon which results of the service requests from the plurality of vendors are displayed.

FIG. 1A is a high level functional block diagram illustrating the various inputs that can be received by a pricing service provider 202, who in response to an input will send a pricing request to a plurality of service vendors 212a-212c (noting that the three service vendors shown in the Figure are simply exemplary, and that price requests may actually be sent to more or fewer service vendors).

A first type of input that can be received by pricing service provider 202 is a defined service request 206. The term defined service request is intended to encompass those service requests where there is no need to diagnose the vehicle to determine what type of service is required. Such an input will be received when a consumer (which could be an operator 200 or a monitoring service 204) determines that a specific type of service is required, and wants pricing service provider 202 to obtain pricing data for that service. For example, a car owner may realize that their vehicle requires new tires, and request pricing service provider 202 to obtain pricing data for the specific type of tires required from a plurality of service vendors. It should be understood that the defined service request is not limited to tires, but can include any type of vehicle service where the scope of the required service is well characterized at the time of the request. Exemplary, but not limiting defined service requests includes brake replacement (replacement of pads only, or the replacement of pads and resurfacing of rotors), oil changes, tire replacement, cooling system maintenance, scheduled maintenance services, and repair of diagnosed vehicle faults. The defined service request can originate from a vehicle operator (such as an individual car owner or a fleet operator) or from a third party monitoring service, which regularly acquires vehicle performance data, and monitors the vehicle performance data to identify any vehicle service needs. Vehicle manufactures are increasingly collecting and storing vehicle performance data from vehicles they manufacture and sell. Manufactures such as General Motors, Ford, and Hyundai each have varying abilities to collect vehicle performance data. Applicant is developing data collection components to be installed in fleet vehicles (such data collection components are often integrated into position tracking components), to be used by vendors to offer monitoring services to alert vehicle owners to service issues that can be proactively addressed before failures take vehicles out of service or result in more costly repairs. Such a monitoring service (via the manufacturer or some other party) can analyze the vehicle performance data, and contact the pricing service provider when the need for vehicle service is identified. The pricing service provider will then provide the monitoring service with the price quotes, and the monitoring service can provide those pricing quotes to their clients (the vehicle operator). In at least one embodiment, discussed below, the pricing service provider and monitoring service are the same entity.

A second type of input that can be received by pricing service provider 202 is vehicle performance data 208. The term vehicle performance data is intended to encompass all types of data collected from a vehicle that can be used to diagnose a vehicle fault or to identify an anomalous condition that should be addressed. Vehicle performance data specifically includes operational data and fault code data. Vehicle performance data can be collected on an ongoing basis by a vehicle monitoring service. Vehicle performance data can also be collected when the operator of the vehicle suspects that some type of vehicle service is required, but the specific service required cannot be defined by the vehicle operator. The vehicle performance data is conveyed to the pricing service provider, and the pricing service provider can analyze the vehicle performance data to determine what service is needed. The pricing service provider can also convey the vehicle performance data to the service vendors, so each vendor can analyze the vehicle performance data to determine what service is needed. Note that as shown in FIG. 1A, pricing service provider 202 can receive vehicle performance data 208 from operator 200, from monitoring service 204, or from vehicle 210.

When the pricing service provider receives the vehicle performance data from operator 200, the operator will suspect that some service is needed, but will not be certain what specific service is required (i.e., a diagnosis is required). In this context, the vehicle performance data is acquired by the operator/consumer and conveyed to the pricing service provider along with a request for service. Low cost diagnostic units capable of extracting fault code data and other vehicle performance data from vehicles are increasingly available. In at least one embodiment disclosed herein, individual consumers use such equipment to transfer vehicle performance data to their smart phones, and such data is then conveyed to the pricing service provider.

When the pricing service provider receives the vehicle performance data from monitoring service 204, the monitoring service may suspect that some service is needed, but will not be certain what specific service is required (i.e., a diagnosis is required). In this context, vehicle performance data acquired and stored by the monitoring service is conveyed to the pricing service provider along with a request for service. Note that in some business models, the monitoring service will have access to diagnostic tools that can be used to analyze the vehicle performance data, such that a defined service request can be conveyed to the pricing service vendor. Some monitoring services may employ relatively simply diagnostic algorithms to identify potential problems, and outsource detailed diagnostic functions to either the pricing service provider or service vendors.

When the pricing service provider receives the vehicle performance data from the vehicle, the pricing service provider is also functioning as a monitoring service.

Once the service vendors submit pricing to the pricing service vendor, those prices are conveyed to one or more of the monitoring service and operator. In some embodiments, the pricing service provider generates a webpage 214 to communicate with one or more of the service vendors, the operator, and the monitoring service. In at least one embodiment, the webpage hosts a reverse auction in which service vendors compete for the service business. FIG. 5 (discussed below) illustrates an exemplary webpage.

FIG. 1B is a high level functional block diagram providing greater detail about the various inputs that can be received by a pricing service provider 202. A block 216a corresponds to an input received from a consumer (such as a fleet operator or the owner of a private vehicle) who has a well defined service request, such as the replacement of tires, or the repair of a previously diagnosed condition (noting that such services are intended to be exemplary, and not limiting). A block 216b corresponds to an input received from a consumer (such as a fleet operator or the owner of a private vehicle) who recognizes that some type of service should be performed, but cannot specifically define the scope of the service. That consumer will send a poorly defined service request to pricing service provider 202, along with vehicle performance data that the pricing service provider or service vendors can use to diagnose the required service before providing price quotes. A block 216c corresponds to an input received from a consumer (such as a fleet operator or the owner of a private vehicle) who recognizes that some type of service should be performed, but cannot specifically define the scope of the service, and who employs a monitoring service to collect and store vehicle performance data. That consumer will send a poorly defined service request to pricing service provider 202, along with a request that the vehicle performance data needed be acquired from the monitoring service. In some embodiments, the consumer sends a request to the monitoring service to forward the vehicle performance data to the pricing service provider, while in other embodiments the consumer sends a poorly defined service request to the pricing service provider, and the pricing service provider obtains the vehicle performance data from the monitoring service. A block 216d corresponds to an input received from a monitoring service that has used vehicle performance data to diagnose a specific vehicle service. The monitoring service sends a well defined service request to the pricing service provider to obtain pricing quotes for the service. A block 216e corresponds to an input received from a monitoring service that has used a basic diagnostic algorithm to determine that some poorly defined vehicle service should be performed. The monitoring service sends a poorly defined service request to pricing service provider 202, along with vehicle performance data that the pricing service provider or service vendors can use to more specifically diagnose the required service before providing price quotes.

FIG. 1C is a high level flow chart showing the overall method steps implemented in accord with one aspect of the concepts disclosed herein, where a consumer suspects that a specific vehicle needs servicing, but does not understand what specific service is required, and that consumer wants a pricing service provider to obtain pricing data for the vehicle service. In a block 218, a consumer suspects that a specific vehicle requires servicing, but cannot define the scope of the service that is required. In a block 220, the consumer extracts vehicle performance data from the vehicle and sends the vehicle performance data along with a service request to a pricing service provider (this corresponds to the input of block 216b of FIG. 1B). Many relatively low cost diagnostic tools are available to consumers to extract vehicle performance data (including but not limited to fault codes) from their vehicles. Even without access to such tools, vehicle operators can pay a modest fee to have such data extracted from their vehicles (auto parts stores are known to provide this service free, so that they can obtain revenue from selling the consumer the parts and tools required to perform the service themselves). In one embodiment, the consumer simply sends the numerical fault codes to the pricing service provider along with a service request. In general, a service request will include basic information about the vehicle, including but not limited to the vehicle's make, model, mileage, equipment, and vehicle identification number (such information is often used in diagnosing a particular fault code), along with any information about how a suspected problem condition is manifesting itself in the vehicle (excess fuel consumption, hard starting, reduction in power, etc.) In other embodiments, the consumer will acquire an electronic data file from the vehicle, and that data file is sent to the pricing service provider along with the service request. In at least one embodiment, the consumer employs a dongle (i.e., a hardware connector) that couples a smart phone to a data port in the vehicle (such as an onboard diagnostics (OBD) port), such that the electronic data is imported from the vehicle into the smart phone. The electronic data file extracted from the vehicle is then conveyed to the pricing service provider along with the service request. In a block 222, the pricing service provider conveys the service request to a plurality of service vendors to obtain pricing data. It should be understood that block 222 encompasses embodiments where the pricing service provider diagnoses the vehicle performance data and sends a defined service request to the service vendors, embodiments where the pricing service provider diagnoses the vehicle performance data and sends a defined service request and the vehicle performance data to the service vendors, and embodiments where the pricing service provider does not diagnose the vehicle performance data, but sends a poorly defined service request and the vehicle performance data to the service vendors. In a block 224 the service vendors provide pricing data for performing the required service. It should be understood that block 224 encompasses reverse auction embodiments, as well as embodiments where each service vendor simply quotes their price. In a decision block 226 the consumer selects (or not) a service vendor. If no service vendor is selected, the method terminates. If a service vendor is selected, then the pricing service provider facilitates the transaction between the consumer and the selected service vendor in a block 228. While such facilitation is not required, the pricing service provider will likely have a vested interest in facilitating the transaction. While it is possible that the pricing service provider will provide the pricing service for free (perhaps in order to drive traffic to a website, where the pricing service provider earns advertising revenue), in at least some embodiments the pricing service provider will earn a transaction fee (most likely from the winning service vendor). Thus, in at least some embodiments encompassed by the concepts disclosed herein, the pricing service provider is involved in the transaction between the selected service vendor and the consumer. In at least one embodiment, the pricing service provider handles the payment between the consumer and the service vendor, enabling the pricing service provider to retain part of the fee. In at least one embodiment, the pricing service provider handles the scheduling between the consumer and the service vendor, enabling the pricing service provider to bill the service vendor (and/or consumer) for the pricing service provided. In at least one embodiment, the pricing service provider withholds some service vendor identification details from the consumer, to prevent the consumer from bypassing the pricing service provider, and preventing the pricing service provider from earning a fee. For example, the pricing service provider can withhold one or more of the following types of information about the service vendors until the pricing service provider is paid a fee: the name of the service vendor, the address of the service vendor, and the telephone number of the service vendor.

FIG. 1D is a high level flow chart showing the overall method steps implemented in accord with one aspect of the concepts disclosed herein, where a consumer enrolled in a monitoring service (the monitoring service collecting and storing vehicle performance data for the consumer's vehicle) suspects that a specific vehicle needs servicing, but does not understand what specific service is required, and that consumer wants a pricing service provider to obtain pricing data for the vehicle service. In a block 218a, a consumer suspects that a specific vehicle requires servicing, but cannot define the scope of the service that is required. In a block 219, the consumer sends a service request to a pricing service provider (this corresponds to the input of block 216c of FIG. 1B). In a block 220a, vehicle performance data is obtained from the monitoring service. It should be understood that block 220*a* encompasses embodiments where the pricing service provider requests the vehicle performance data from monitoring service (so that a diagnosis of the required service can be made) as well as embodiments where the consumer requests the vehicle performance data from monitoring service (so that a diagnosis of the required service can be made). The steps of blocks 222, 224, 226, and 228 remain consistent with the description of those blocks provided above in connection with FIG. 1C.

FIG. 1E is a high level flow chart showing the overall method steps implemented in accord with one aspect of the concepts disclosed herein, where a monitoring service collecting and storing vehicle performance data for a client's vehicle is the consumer from the standpoint of the pricing service provider, and the monitoring service suspects that their client's vehicle needs servicing based on the vehicle performance data they monitor. In a block 221, the monitoring service detects that a specific vehicle requires servicing. In a block 223, the monitoring service sends a service request to the pricing service provider. It should be understood that blocks 221 and 223 encompasses embodiments where the monitoring service has conclusively diagnosed what service is required (i.e., the monitoring service has performed a high level diagnostic, consistent with block 216*d* of FIG. 1B), as well as embodiments where the monitoring service has not conclusively diagnosed what service is required (i.e., the monitoring service has performed only a cursory diagnostic, consistent with block 216*e* of FIG. 1B). If the monitoring service has performed a detailed diagnosis, then no vehicle performance data need be sent to the pricing service provider with the service requests. However, it will be simple for the monitoring service to send the pricing service provider the vehicle performance data from which the diagnosis was made, and unless confidentiality issues preclude sharing that information with the pricing service provider, in at least some embodiments the vehicle performance data will be included even when the monitoring service believes they have correctly diagnosed the service required. If the monitoring service has performed only a cursory diagnosis, then the vehicle performance data needs to be sent to the pricing service provider with the service request, so the detailed diagnosis can be performed by the pricing service provider or the service vendors, generally as discussed above. The steps of blocks 222, 224, 226, and 228 remain consistent with the description of those blocks provided above in connection with FIG. 1C. Note that in block 228, the pricing service provider may be interacting with the monitoring service (who then interacts with their client, the vehicle operator), and/or with the vehicle operator (the client of the monitoring service).

FIG. 1F is a high level flow chart showing the overall method steps implemented in accord with one aspect of the concepts disclosed herein, to convey performance data from a vehicle to a remote monitoring service that uses the performance data to diagnose any mechanical problems with the vehicle. The monitoring service then collects quotes for the required repair, and provides the operator of the vehicle with information describing the identified mechanical fault and the repair costs from a plurality of vendors. In at least one embodiment, the repair costs have been determined in a reverse auction, where vendors compete and bid for the opportunity to repair the diagnosed mechanical problem. The vendors may also simply submit non-binding or binding quotes to repair the mechanical problem. Note that in this embodiment, the monitoring service and the pricing service provider are the same entity.

Referring to an exemplary embodiment shown in FIG. 1F, in a block 10, each vehicle enrolled in the diagnostic system is equipped with components to collect vehicle performance data (which in at least some embodiments includes operational data, which may be collected in a data buffer or contemporaneously acquired from a vehicle data bus), a data link to convey the performance data to a remote computing device for monitoring, and a processor for controlling the conveyance of the performance data to the remote computing device. It should be noted that in other exemplary embodiments, vehicle performance data need not be used to initiate an automated request for quotes or bids to repair a maintenance problem on a vehicle. Instead, the operator may transmit a request for quotes or bids to be automatically solicited to repair a problem with the vehicle either detected by the vehicle or by the operator. In a block 12, the data link is used to convey the vehicle performance data (or a request to solicit quotes or bids for repairing the problem) to the remote monitoring service, i.e., to a server or computing device operated by the monitoring service.

In an exemplary, but not limiting embodiment, the vehicle includes a position sensing component as well, and position data and performance data are generated by the vehicle, and also transmitted to the remote monitoring service.

It should be emphasized that data that are acquired during an inspection of the vehicle may also be transmitted to the remote monitoring service. For example, a portable data entry device might be used to collect and transmit data concerning the status of components on the vehicle. One such exemplary portable data collection device disclosed in the patents referenced above includes a sensor that detects a token disposed at each location on a vehicle included on a list of components to be inspected, when the portable data collection device is positioned proximate to the token, thereby ensuring that the person doing the inspection actually was physically present next to each of the components that are being inspected. The person can enter data relating to the condition or status of each component into the portable data collection device for subsequent transmission to the remote monitoring service. In addition, even when noting that a component on the vehicle is in need of service or repair while operating the vehicle or simply walking by the vehicle, an operator can submit data electronically to the remote monitoring service that is indicative of the condition noted by the operator. For example, the operator may notice that a light on the vehicle is not working and needs to be replaced while walking around the vehicle, or while driving the vehicle, may notice that the engine is running rough or may detect an unusual noise in the valves. Also, the vehicle may providing a warning to the operator that a problem has been detected, so that the operator can then transmit a request for automatically soliciting quotes or bids from interested service vendors, to repair the problem. For example, while driving the vehicle, a display panel in the vehicle may indicate some abnormal condition to the operator, who can then electronically transmit that information to the remote monitoring service. Such observations or requests can be submitted by telephone or through a data link connection to the remote monitoring service. Thus, the data submitted to the remote monitoring service need not be limited to that automatically produced and transmitted by the vehicle system without input by the operator. It should be recognized that such a portable data collection device can also be used in embodiments where no monitoring service is used, and data from the handheld portable data collection device is conveyed to the pricing service provider, to provide the pricing service provider with details about the vehicle service to be priced.

In a block 14, if the vehicle data does not already indicate the nature of the problem requiring service or repair, a processor at the remote monitoring service location is used to analyze the performance data to determine if a mechanical fault has been detected. This analysis is ongoing, as performance data from the vehicle is conveyed to the remote monitoring service in ongoing data transmissions. In an optional block 16, the processor at the monitoring service (i.e., the remote location) may request additional data from the vehicle to facilitate the analysis or to confirm a diagnosis. For example, changes in the vehicle performance data over time may indicate that a mechanical fault is developing, and certain additional types of performance data would enable a conclusive diagnosis to be achieved. It is again noted that during operation of the vehicle, or during routine inspections, or while simply being near the vehicle, defects or the need for repair or maintenance of the vehicle can also be determined by visual inspection or other perception, e.g., by the operator of the vehicle while operating the vehicle, and the data provided by these visual and other types of observations can be included with the vehicle location (from GPS) as well as data generated by the vehicle computer(s) for purposes of determining that a mechanical fault or problem requires attention and possible repair, either by the vehicle or by the remote monitoring service. In embodiments where the monitoring service and the pricing service provider are separate entities, upon identifying a fault (either a fault that has actually occurred or a fault that the data analysis predicts will occur), the monitoring service can convey a service request to the pricing service provider, generally as discussed above. It should also be understood that in some embodiments encompassed by the concepts disclosed herein, the diagnostic analysis of vehicle performance data can also be implemented by the pricing service provider, and/or service vendors.

Once a mechanical fault has been identified by a monitoring service (or a request from a consumer to automatically solicit repair quotes or bids from interested service vendors), in a block 18, the monitoring service (or another third party vendor, such as a pricing service provider, where the monitoring service and pricing service provider are not the same entity) contacts a plurality of providers of vehicle repair services and requests bids (or non-binding or binding quotes) for the required repair. It should be noted that this task may be carried out by a different entity than the one monitoring the conditions in the vehicles. In at least one embodiment, the bids are requested in a reverse auction style format, where the vehicle repair providers bid on the job. The vendor then makes the diagnosis and the reverse auction bid results available to the vehicle operator, as indicated in a block 20. In an optional block 22, the monitoring service schedules the repair. The logic then returns to a block 12, where additional performance data is received from the vehicle, and monitoring of the performance data for additional mechanical faults continues.

It should be recognized that the term "performance data" is intended to encompass data collected at the vehicle that can be used by a computing device to identify a mechanical fault. Such data can include fault code data, data from dedicated sensors added to the vehicle to aid in diagnosing a mechanical fault, and operational data. As noted above, "operational data" encompasses data that is used to control the operation of the vehicle. In the prior art, operational data is not stored, but rather generated, contemporaneously, used as necessary to control various vehicular systems (such as a fuel injection system, a cooling system, or a braking system), and then discarded. Exemplary operational data include, but is not limited to, engine coolant temperature, engine speed, oxygen levels, throttle position, brake temperature, vehicle speed, brake position, and gearbox parameters. Much of this data is collected very frequently, some types of operational data being collected multiple times per second. The sheer quantity of operational data being generated makes storing or archiving all of such operational data problematical. Due to the volume of operational data generated in the course of vehicle operations, it is problematical to convey all operational data generated by the vehicle to a remote monitoring service. The concepts disclosed herein encompass several strategies for managing the task of reducing a quantity of performance data generated by the vehicle and conveyed to the remote monitoring service. In addition, the present approach encompasses both the manually collected information provided, for example, by an operator, and the automatically generated data produced by the vehicle's computerized system.

In at least one embodiment, a data buffer is added to the vehicle to temporarily store operational data, such that when a fault code is generated at the vehicle, the fault code data and at least some of the buffered operational data are conveyed to the remote monitoring service. Thus, rather than transmitting all of the operational data generated by a vehicle to the remote monitoring service, only operational data linked to a fault code event is transmitted.

In at least some embodiments involving a monitoring service, in addition to or instead of linking operational data to fault code events, different types of performance data are conveyed to the remote monitoring service during different transmissions. For example, injector data can be included in a first transmission, oxygen sensor data can be included in a second transmission, brake sensor data can be included in a third transmission, and so on until many different types of performance data are conveyed to the remote server over time. The quantity of performance data conveyed during each different data transmission can be selected to match a desired bandwidth. Where data transmission costs are relatively higher, relatively less performance data can be sent during each different data transmission. Where data transmission costs are relatively lower, relatively more performance data can be sent during each different data transmission. Depending on a desired quantity of data to transmit to the remote monitoring service during each different transmission, more than one type of performance data can be conveyed in the same transmission (i.e., injector data plus brake data, or some other combination). Generally, the amount of data transmitted during each transmission will be relatively small, e.g., less than a kilobyte (or in some embodiments, multiple kilobytes, but less than hundreds of kilobytes, though it should be understood that such data volumes are exemplary, and not limiting). By sending different types of performance data to the monitoring service at different times (i.e., in different transmissions), the monitoring service can build a database of vehicle performance data over time and still receive a very manageable volume of data during each data transmission. In embodiments where the monitoring function is ongoing over an extended period, sufficient data can be acquired to enable the monitoring service to detect changes in the performance data indicative of a developing or worsening mechanical fault. If trying to perform a diagnosis at just one point in time (i.e., in response to just a single transmission of vehicle performance data), it might be necessary to include as much data as possible in that one transmission. In embodiments where the monitoring service collects performance data from a vehicle over an extended period of time, transmission of smaller data sets is acceptable. Where different types of performance data are transmitted to the remote monitoring service at different times, in at least one embodiment, one or more types of operational data are pulled from a data bus (i.e., operational data currently being generated by the vehicle are acquired) in the vehicle at the time of the data transmission to the remote monitoring service.

Where different types of vehicle performance data are sent in different data transmissions, many different possibilities exist for selecting data to include in each transmission. Of course, the operator provided input can be sent when the operator desires, or alternatively, can be included with the next transmission of the data automatically provided by the vehicle system. The selection of the data provided by an automated system can be based on a predefined schedule, or can be manually selected if the operator wants to expedite input of a specific type of data, or wants to prioritize the type of data transmitted most often. Once each different data type has been transmitted at least once, the schedule can be repeated in the same sequence (i.e., data types A, B, and C are sent in sequence A-B-C, repeatedly), or the sequence can be varied (i.e., data types A, B, and C are sent in sequence A-B-C initially, and then in a different order in a subsequent sequence of transmissions). The selection of data for a specific transmission can be performed at random, and over an extended period of time performance data from all different categories are likely to be received by the remote monitoring service.

Several techniques can be used to control the timing between different data transmissions from the vehicle to the remote monitoring service. In at least some embodiments, the time period between subsequent data transmissions is based on a predetermined time interval (for example, a new data transmission can be executed at hourly intervals (or be executed based on a larger or a smaller fixed time period)). In at least some embodiments, the time period between subsequent data transmissions is based on a randomly determined time interval (for example, the time period between subsequently data transmissions can be randomly varied). Such random variations can be controlled as desired. For example, in some embodiments there will be a fixed number of data transmissions over a predefined time period (for example, four data transmissions per each hour of vehicle operation), but the intervals between subsequent data transmissions can be randomly varied. In at least some embodiments, the time period between subsequent data transmissions is based on a predetermined event. For example, in some embodiments a different data transmission is executed whenever a particular event occurs. Exemplary events include, but are not limited to, powering up the vehicle, powering off the vehicle, the generation of a fault code in the vehicle, a measured vehicle parameter exceeds or falls below a predetermined value (i.e., engine temperature exceeds a predetermined value, oil pressure exceeds a predetermined value, oil pressure drops below a predetermined value, etc.). In at least some embodiments, the vehicle is equipped with a position sensing system that is configured to convey position data to a remote computer device according to either a predefined schedule (i.e., every five minutes, such a time interval being exemplary and not limiting) or when a predefined event occurs (i.e., the vehicle heading changes by a certain extent, such an event being exemplary and not limiting). In such embodiments, each time position data is transmitted from the vehicle to a remote computing device, performance data is included in the same transmission (in such an embodiment, the monitoring service tracks vehicle performance data and position data for the operator of the vehicle).

The vehicle position data can be used by the vehicle monitoring service (or a third party, such as the pricing service provider discussed above, in embodiments where the monitoring service and the pricing service provider are separate entities) to select service vendors that will be contacted to get prices for the required repair. In at least one embodiment, the vehicle monitoring service monitors vehicles over a relatively large geographical range (i.e., regionally or nationally), and will have prescreened or otherwise qualified many different service vendors. The pool of vendors can be narrowed based on the location of the vehicle as indicated by the current vehicle position data, or by data provided by the vehicle operator about an intended destination of the vehicle—as appropriate for the type and importance of the repair required. The service vendors automatically contacted to solicit quotes or bids can also be limited to those specializing in the specific type of repair required. For example, if the required repair is for an exhaust system, bids or quotes for repairing an exhaust system problem on the vehicle may be limited only to those vendors specializing in that type of repair work. Where an identified mechanical fault needs to be repaired immediately to prevent damage to the vehicle or to address an unsafe or legally non-compliant operating condition, the vehicle monitoring service can use the vehicle's current location as the basis for selecting from which service vendors repair quotes (or reverse auction bids) should be solicited (i.e., providers of vehicle repair services who are located beyond a predefined distance are not allowed to bid in the reverse auction, or are not contacted by the monitoring service (or the third party) for a repair quote). In at least one embodiment, vehicle operators can define, or redefine, the predefined distance about a desired location from which to solicit bids for the repair job. Note that enabling the consumer to define a preferred geographical location for service vendors is a functionality that can be implemented into each of the embodiments encompassed in FIGS. 1A and 1B (which illustrate different inputs that can be received by the pricing service provider).

Where the identified mechanical fault does not need to be repaired immediately, the vehicle monitoring service can contact the vehicle operator before obtaining repair costs from service vendors (or before requesting the pricing service provider to obtain price quotes, in embodiments where the pricing service provider and the monitoring service are different entities), to enable the vehicle operator to define the appropriate repair location. In an alternative embodiment, vehicle operators can affirmatively provide the monitoring service (or the pricing service provider) with the vehicle's scheduled route, such that the monitoring service (or the pricing service provider) can solicit service vendors based on the scheduled route. For example, the scheduled route may indicate that a first stop must be made in Seattle, Wash. by a specific time and date, a second stop must be made to Portland, Oreg. by a specific time and date, and no additional stop is currently scheduled. Based on the distances involved and the scheduled times, as well as the time-criticality of the required repair, the monitoring service (or the pricing service provider) can determine if there is time to perform the repair in Seattle (or some location between Seattle and Portland) before the stop in Portland is scheduled. If there is sufficient time between the scheduled deliveries, the monitoring service (or the pricing service provider) can solicit repair quotes from vendors in the Seattle area, or service vendors along the Seattle to Portland corridor. If there is not sufficient time between the scheduled deliveries, the monitoring service can solicit repair quotes from vendors in the Portland area only. Once the bids (in a reverse auction) or quotes have been obtained from the service vendors, the operator can make a selection of the service vendor to carry out the repair work. The selected service vendor may not be the lowest bid or quote to do the work, since the operator may include other factors besides the cost bid or quote in making this selection. For example, the second lowest quote may be from a service vendor having a business located closer to the location where the repair is desired (or the current location—if repair is required immediately). Or, the selected vendor may be chosen by the operator based on the reputation of the vendor or based on the indicated time delay before the repair work can be started by the vendor.

In general, the analysis of the performance data will be carried out by a remote computing device (i.e., remote from the vehicles enrolled in the monitoring service) operated by the monitoring service vendor, unless the nature of the required repair has already been determined by the operator input data or by the computing system on the vehicle. The remote computing device performing the monitoring function in at least one embodiment comprises a computing system controlled by the operator of the vehicle (i.e., the monitoring service is operated by the vehicle owner, who may operate of a fleet of vehicles), while in other exemplary embodiments, the computing system performing the monitoring function is controlled by an independent party or vendor who manages the monitoring/diagnostic service for the operators of the enrolled vehicles (in some embodiments, the vehicle monitoring service bills the vehicle operators a subscription fee). The remote computing device can be operating in a networked environment and can comprise multiple computing devices that may be disposed at disparate geographical locations or at a single location. In at least one embodiment, the monitoring service provides sufficient data to the repair vendors that such data can be input into a diagnostic software application known to the repair vendor, so the repair vendor can confirm the diagnosis, or derive their own diagnosis independent of the monitoring service.

FIG. 2 schematically illustrates an exemplary computing system 250 suitable for use in implementing the method of FIG. 1F (i.e., for executing at least blocks 14-20 of FIG. 1F, noting that such a computing device can also be employed to implement the functions of the methods of FIGS. 1C-1E). Similar components might be used in a data terminal within a vehicle to enable the operator to input information related to the status of the vehicle or components on the vehicle, so that the information can be transmitted to the remote monitoring vendor. Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of performance data (and in some embodiments, of position data) collected from enrolled vehicles, to identify mechanical faults in the enrolled vehicles. The machine instructions implement functions generally consistent with those described above with respect to blocks 14-20 of FIG. 1F. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing (i.e., to monitor vehicle performance data over time to detect a mechanical fault). Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. Data link 264 is configured to enable vehicle performance data (and position data when desired) collected in connection with operation of enrolled vehicles to be input into computing system 250 for analysis to identify a mechanical fault with the vehicle. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet. Note that vehicle performance data from the enrolled vehicles will be communicated wirelessly, either directly to the remote computing system that analyzes the data to diagnose the anomaly, or to some storage location or other computing system that is linked to computing system 250.

It should be understood that the term "remote computer" and the term "remote computing device" are intended to encompass a single computer as well as networked computers, including servers and clients, in private networks or as part of the Internet. The vehicle data received by the monitoring service from the vehicle can be stored by one element in such a network, retrieved for review by another element in the network, and analyzed by yet another element in the network. In at least one embodiment, a vendor is responsible for diagnosing the vehicle data, and clients of the vendor are able to access and review such data, as well as any resulting diagnoses. While implementation of the method noted above has been discussed in terms of execution of machine instructions by a processor (i.e., the computing device implementing machine instructions to implement the specific functions noted above), the method could also be implemented using a custom circuit (such as an application specific integrated circuit or ASIC).

FIG. 3 is a functional block diagram of exemplary components used in vehicles 28 that are enrolled in the vehicle diagnostic service, to implement some of the method steps shown in FIG. 1F. An exemplary vehicle monitoring service is based on adding an optional data buffer 36 (or other short-term memory storage) and a bi-directional data link 34 to each enrolled vehicle (in an exemplary, but not limiting embodiment, the data buffer and data link are combined into a single component). It should be understood that the short term memory storage is not required for embodiments where the performance data transmitted from the enrolled vehicle does not include operational data that must be briefly stored. In an exemplary embodiment, the data link is a combination radio frequency (RF) transmitter and receiver, although separate transmitters and receivers could be used. A data terminal can also be included in the vehicle to facilitate operator entry of information and operator transmission of information that is presented to the operator on a display within the vehicle. The data collected on the portable data collection device during an inspection can also be uploaded through such a data terminal, or independently by direct transmission to the remote monitoring service. While RF data transmission represents an exemplary embodiment, other types of data transmission could be employed. If the vehicle does not already include performance data/operational data collecting components 30, such components are added. As discussed above, most vehicles manufactured today include such operational data collecting components already, as many of today's vehicles are designed to use such continuously generated operational data to control operation of the vehicle in real-time, and such vehicles generally include data collecting components, data buses, and controllers that use the operational data to control the operation of the vehicle. The vehicle includes at least one processor 32 that performs the function of managing the transmission of performance data from the vehicle to the remote monitoring service, according to one or more of the transmission paradigms discussed herein. In embodiments where the performance data includes temporary storage of operational data, the processor also implements the function of temporarily storing operational data from components 30 in data buffer 36 or other temporary storage, detecting an anomalous condition (or predefined condition) in the vehicle, and in response to detecting such an anomaly, using bi-directional data link 34 to convey real-time anomaly data and the buffered operational data from the enrolled vehicle to a remote computing device 40 (which is used to determine or diagnose a cause for the detected anomaly). It should be understood that those processor functions can be implemented by a single processor, or distributed across multiple processors.

Although the preceding discussion focuses on automated data collection of data collected from a vehicle sensor and monitoring system, it should be emphasized that the present approach can be implemented by electronically transmitting manually collected information to the remote monitoring service to initiate determination of the specific type of repair problem, as necessary, and to solicit bids from repair service providers to implement the repair or service of the vehicle that is required. The electronically initiated solicitation of such bids, for example, in a reverse auction, will enable the operator of the vehicle to select the repair service vendor to do the work from among a broader listing of interested repair service vendors and taking into consideration the costs that will be charged by each interested repair service vendor entering a bid to do the work.

In some embodiments, an output 38 is also included, to provide mechanical fault/diagnostic related information to the driver in a form that can be easily understood by the driver. Output 38 can be implemented using one or more lights (for example, a red light can be used to indicate that a problem has been detected which requires the operator to stop the vehicle, or to modify vehicle operations, such as by slowing down to reduce a load being placed on the vehicle until a repair can be made), using a speaker providing an audible output, and using a display providing a visual output. Note that output 38 can be combined into a single component with the data buffer and the data link, so only a single additional component is added to the vehicle (recognizing that most vehicles already include the additional required components, such as the operational data collecting components and the processor).

As indicated in FIG. 3, remote computing device 40 (operated by the monitoring service) is logically coupled via a network 42 (such as the Internet) to a computing device 44 accessible to a vehicle repair service vendor (noting only one such vendor is shown in the Figure; however, the monitoring service (or a third party) will be exchanging data with a plurality of different service vendors, each likely having access to a different computing device 44), and a computing device 46 accessible to a vehicle operator (noting that in at least some embodiments, the monitoring service performs the monitoring function for a plurality of different vehicle operators). Network 42 facilitates communication between computing devices 40, 44, and 46, enabling the monitoring service (and a third party who may be employed to solicit the bids from the service vendors) to efficiently communicate with service vendors and vehicle operators.

The concepts disclosed herein are in at least some embodiments intended to be used by fleet owners operating multiple vehicles, and the performance data conveyed to the remote location for diagnosis will include an ID component that enables each enrolled vehicle to be uniquely identified. The concepts disclosed herein are also applicable to individual consumers, who desire to employ the pricing service provider discussed herein to obtain pricing (in some embodiments, via a reverse auction) from a plurality of service vendors who can service the consumer's vehicle.

FIG. 4 is a functional block diagram of various elements that can be employed to implement the method steps of FIG. 1F. The elements includes a plurality of enrolled vehicles 48a-48c (noting that the concepts disclosed herein can be applied to a different number of vehicles), a plurality of repair (or service) vendors 52a-52c (noting that the concepts disclosed herein can be applied to a different number of service vendors), a plurality of vehicle operators 56a-56c (noting that the concepts disclosed herein can be applied to a different number of vehicle operators), and a remote monitoring service 50. Each vehicle includes the components discussed above in connection with FIG. 3, enabling the vehicle to convey performance data from the vehicle to remote monitoring service 50, which monitors the performance data from each vehicle 48a-48c over time to identify any mechanical fault in the vehicle. When such a mechanical fault is identified, remote monitoring service 50 contacts repair vendors 52a-52c to obtain repair costs to fix the mechanical fault that was detected by monitoring the vehicle performance data (or identified by the vehicle operator via an inspection of the vehicle, or via an in-vehicle identification of a fault). In an exemplary embodiment monitoring service 50 generates a webpage (as indicated by webpages 54a-54c) for each vehicle in which a mechanical fault is detected, and that webpage is made available to the corresponding vehicle operator. It should be understand that other techniques, such as email, automated phone calls, and text messaging can also be used by monitoring service 50, in addition to or instead of webpages, to inform vehicle operators of identified mechanical faults and repair options. It should be recognized that certain vehicle operators may have a plurality of vehicles enrolled in the vehicle monitoring program, thus FIG. 4 should not be interpreted that there must be a 1:1 correspondence between the number of enrolled vehicles and the number of vehicle operators (or a 1:1 correspondence between the number of enrolled vehicles and the number of repair vendors).

It should be understood that monitoring service 50 is implemented using a remote computing device, and that the term remote computing device is intended to encompass networked computers, including servers and clients, in private networks or as part of the Internet. The monitoring of the vehicle performance data by monitoring service 50 can be performed by multiple different computing devices, such that performance data is stored by one element in such a network, retrieved for review by another element in the network, and analyzed by yet another element in the network.

In at least one exemplary embodiment, vehicle operators can establish standards that the monitoring service uses to select repair vendors for providing pricing data. For example, a first vehicle operator may only want price quotes from service vendors having a specific level of insurance, or who exceed a specific size, or who are part of a chain of service centers. A second vehicle operator may only want price quotes from service vendors whom they have prequalified. A third vehicle operator may place no restrictions on the repair vendors the monitoring service approaches for pricing data.

In at least one embodiment, the diagnostic/monitoring function performed by the monitoring service involves comparing the performance data from the vehicle with historical data linked to a specific fault condition. This comparison can involve vehicle parameters extending beyond the collected performance data, which is broadly referred to herein as "contextual data." Such vehicle parameters include, but are not limited to, the VIN #, the firmware data used on the vehicle data system, the year, make and model of the vehicle, the engine employed in the vehicle, the transmission employed in the vehicle, and additional equipment employed on or added to the vehicle to customize the vehicle to the operator's needs. This additional data can help increase the accuracy of the diagnostic aspect of the monitoring service and better determine the parts required and the cost to repair the vehicle, because the historical data records may indicate that a particular set of performance data from one make and model of a vehicle having a specific equipment configuration was associated with a first mechanical fault, while a similar set of performance data from a differently equipped vehicle (either a different make and model, or a similar make and model with different equipment) was associated with a different mechanical fault. Analyzing the performance data in light of the make, model, and specific equipment configuration of a vehicle, as well as any available vehicle inspection data for the vehicle, can thus improve the accuracy of a diagnosis of a mechanical fault. This approach is often used for troubleshooting vehicle problems, since the details of the vehicle and its configuration can directly impact on the results of the troubleshooting process. It should be noted that the diagnostic function can also or alternatively be carried out by any of the repair vendors solicited to quote or bid on the repair job, and the above-noted performance data and contextual data can be supplied to each such vendor to enable them to be more confident that they are bidding or quoting on the actual repair job that needs to be completed.

While FIG. 4 has been illustrated and discussed in terms of a single entity implementing the functions of monitoring vehicle performance data (see block 204 of FIG. 1A) and acquiring pricing data from a plurality of service vendors (see block 202a of FIG. 1A), it should be recognized that FIG. 4 is also relevant to embodiments where reference numeral 50 refers to a pricing service provider (which does not also perform a monitoring function), receiving inputs related to vehicle operators 56a-56c. FIG. 1B schematically illustrates different types of inputs that can be received by a pricing service provider.

As noted above, once a fault has been identified, the monitoring service contacts repair vendors to get pricing data for the required repair (or contacts a pricing service provider who in turn contacts the service vendors, in embodiments where the monitoring service and the pricing service provider are separate entities). To encourage repair vendors to provide their best pricing, in at least one embodiment, the monitoring service/pricing service provider arranges a reverse auction, where selected repair vendors competitively provide their best price in a reverse auction format (i.e., the repair vendors bid against each other, and are able to see each other's bids, which encourages the repair vendors to lower their prices on successive bids to compete against one another for the repair job). FIG. 5 is an exemplary screen shot of a webpage accessed by a vehicle operator to review the results of a reverse auction for a specific vehicle. A webpage 100 includes a first portion 102 that enables a vehicle operator having a plurality of vehicles to select a specific vehicle. It should be understood that webpage 100 can be unique to only one vehicle, such that portion 102 is not required. Webpage 100 also includes a results section 104, where details of the detected mechanical fault and results from the reverse auction are displayed. It should be understood that the details of the detected mechanical fault and results from the reverse auction can be displayed on different portions of the webpage, or on different webpages and/or different websites, instead of together. Further, if desired, details on the mechanical fault can be omitted (or can be viewed on a separate webpage), although users will likely find the inclusion of such data to be useful. Webpage 100 also includes a map section 106, where the locations of the repair vendors relative to the vehicle location (at the current time or at the time that the vehicle will be available to be repaired) can be viewed. If desired, map section 106 can be omitted, or can be displayed on a separate webpage.

Referring to first portion 102, an operator of multiple vehicles has selected vehicle ZONA0047 (noting that any type of vehicle identification can be employed), such that the data displayed in results section 104 and map section 106 relate to vehicle ZONA0047. As shown in FIG. 5, results section 104 includes results from three different repair vendors. It should be recognized that the specific number of repair vendors displayed here can, and likely will vary, based on the number of repair vendors that respond to the solicitation from the monitoring service (or the third party who is responsible for soliciting bids). If desired, the webpage can limit the results to the best pricing received (or a range of prices), or all of the results can be made available to the vehicle operator. While the monitoring service will endeavor to provide a plurality of repair options to the vehicle operator, based on the vehicle operator's restrictions on repair vendors, or the location of the vehicle (i.e., a remote area where few repair vendors are located), in some circumstances there may be only one repair option available, and in extreme circumstances—none.

Referring to results section 104, exemplary (but not limiting) information displayed herein includes details on the identified mechanical fault (in this example, the mechanical fault is a defective fuel injector), an estimated amount of time required for the repair (most vendors use standardized tables/databases to determine the time required for repairs, or such information can be obtained by using a diagnostic application employed by the monitoring service or the individual repair vendor), the pricing data for each repair vendor (as illustrated, such pricing data is broken out by labor and parts, although it should be understood that the pricing data can simply be provided as a total price), the name and address of each repair vendor, the availability of the repair vendor (Vendor 1, Brett's Truck Repair, has a 1 day wait for the repair, while Vendor 2, Bill's Diesel Service, can perform the repair immediately), a distance between the vehicle and the repair vendor, and a performance rating (wrench icons 108a-108c) for each repair vendor (where a greater number of wrench icons or other type of graphic device indicates a better performance rating, recognizing that while only full icons are displayed in this example, partial wrench icons can be used as well, to provide fractional ratings). Radio buttons 110a-c can be used by the vehicle operator to select the repair vendor who should perform the repair work. In at least one embodiment, the performance ratings are based on work performed by the vendor in connection with a previous repair brokered by the monitoring service, while in at least one embodiment the rankings are based on (or include) performance ratings obtained from a search (performed by the monitoring service) of public comments posted on the Internet about particular vendors.

With respect to webpage 100, it should be understood that the design of webpage 100 is intended to be exemplary, and different webpage designs can be employed, and further, that the data on webpage 100 can be provided to the vehicle operator on more than one webpage. If desired, access to webpage 100 can be restricted only to the monitoring service and vehicle operator. However, providing repair vendors access to webpage 100 will enable the repair vendors to see competing bids, encouraging repair vendors to reduce their bids during the reverse auction to provide the best price to the vehicle operator. It should also be understood that a different webpage could be generated for use during the reverse auction, such that webpage 100 need not be accessible by the repair vendors.

Note that the exemplary webpage of FIG. 5, the service vendors in results section 104 are identified by name, address, and telephone number. It should be recognized that the concepts disclosed herein also encompass embodiments in which one or more of the service vendor's name, address, and telephone number (or other information that can be used to uniquely identify the service vendor) is withheld from the consumer, in order to make it difficult for the consumer to arrange for service directly with the service vendor, and bypass the pricing service provider. Such an embodiment will be important to pricing service providers who charge either the consumer or the service vendor a fee for facilitating the transaction. Once the fee earned by the pricing service provider has been paid, then the service vendor's identification information will be provided.

FIG. 6 is a high level logic diagram showing exemplary overall method steps implemented in accord with the concepts disclosed herein to host a reverse auction for a diagnosed repair to a vehicle. This process is implemented after the monitoring service (or the vehicle system or vehicle operator) identifies a mechanical fault in a vehicle (i.e., FIG. 6 corresponds to block 18 in FIG. 1F). Note a reverse auction can also be implemented when a pricing service provider receives one or more of the inputs identified in FIG. 1B, such as a consumer determining that their vehicle needs new tires. In a block 120, the monitoring service (when the pricing service provider and monitoring service are the same entity) or the pricing service provider (i.e., the remote computing device operated by the monitoring service or by the pricing service provider) selects a plurality of service vendors from which pricing data will be solicited. The selection process can be based on a number of factors, including but not limited to the location of the service vendor, and restrictions on service vendors defined by the consumer. In a block 122, the monitoring service (when the pricing service provider and monitoring service are the same entity) or the pricing service provider (i.e., the remote computing device operated by the monitoring service or by the pricing service provider) defines parameters of the reverse auction. Those parameters will include the identity of the mechanical fault that needs to be repaired (or a well defined service request, or a poorly defined service request and vehicle performance data that can be used to diagnose the required service, generally as discussed above with respect to the inputs of FIG. 1B) the desired service, and the time period of the reverse auction. Where the repair is not time critical, a relatively longer reverse auction may enable the vehicle operator to receive better pricing. However, in some cases, time will be of the essence, and the timeline of the reverse auction will be relatively short, so the repair can be effected promptly. In at least some embodiments, the parameters may include data enabling individual service vendors to perform their own diagnosis based on data provided by the monitoring service.

In a block 124, the monitoring service (when the pricing service provider and monitoring service are the same entity) or the pricing service provider (i.e., the remote computing device operated by the monitoring service or by the pricing service provider) sends the parameters of the reverse auction to the selected vendors. In an exemplary but not limiting embodiment, this step is implemented using email, but other approaches might instead be used, such as an RSS message or a social network transmission. In a block 126, the monitoring service (when the pricing service provider and monitoring service are the same entity) or the pricing service provider (i.e., the remote computing device operated by the monitoring service or by the pricing service provider) hosts the reverse auction for the defined time period. During the defined auction time period, service vendors can visit a website operated by the monitoring service and place their bid on the required repair. In at least one exemplary, but not limiting embodiment, service vendors are allowed to reduce their bid amount during the auction, in response to bids placed by other service vendors. In an exemplary but not limiting embodiment, in addition to providing pricing data, service vendors will include in their bid a commitment of when the repair work can be started (and/or completed), which will enable the vehicle operator to select a service vendor with a slightly higher price who can complete a repair immediately, over the lowest priced vendor who cannot perform the repair immediately. In a block 128, the diagnosis data and the reverse auction results are conveyed to the vehicle owner, for example, by at least one of text message, email, and an automated telephone call (i.e., a robocall). If desired, the vehicle operator or consumer can be contacted when the reverse auction begins, and can be allowed access to the website where the reverse auction is being hosted, so the vehicle operator can monitor the progress of the reverse auction.

In at least one embodiment, the monitoring service or pricing service provider will use a well known or trusted diagnostic software application to perform the diagnosis, or to verify a diagnosis. The use of such a well known or trusted diagnostic software application will likely encourage repair vendors to provide better pricing. Vendors such as Navistar, Detroit Diesel, and Snap-on Tools offer such diagnostic software applications. In a related embodiment, the monitoring service (when the pricing service provider and monitoring service are the same entity) or the pricing service provider, will, in lieu of or in addition to performing a diagnosis, send vehicle data to the repair vendors, so the repair vendors can perform their own diagnosis using a diagnostic software application of their own choosing. In embodiments wherein the repair vendors perform their own diagnosis, the monitoring service (when the pricing service provider and monitoring service are the same entity) or the pricing service provider will determine that requesting pricing from service vendors is warranted based on at least one of the following: the generation of a fault code in the vehicle, the activation of a warning light in the vehicle, the detection by the monitoring service of an anomaly in vehicle data conveyed from the vehicle to the monitoring service, and the diagnosis of a fault by the monitoring service using vehicle data conveyed from the vehicle to the monitoring service.

As discussed above, operational data represents one type of performance data that can be conveyed to the remote monitoring service. As noted above, a majority of vehicles manufactured today already include components to collect operational data during operation of the vehicle. Such data is used during operation of the vehicle, to provide feedback to control many vehicle systems, including but not limited to engine fuel supply components, vehicle braking components, vehicle cooling components, and vehicle transmission components. Conventionally, such data is generated, used by the vehicle immediately, and discarded. In one aspect of the concepts disclosed herein, each time a data transmission from the vehicle to the remote monitoring service occurs, at least a portion of the operational data currently generated by the vehicle is included in the data transmission (the amount of operational data available at any given time is likely too large to be transmitted in total, so some portion of the readily available operational data is selected, and the rest discarded as usual).

As noted above, enrolled vehicles can optionally include a data buffer or memory storage in which operational data is temporarily stored. Further modifications include configuring a processor in the vehicle to convey detected vehicle anomalies (such as fault codes) and to define an anomaly both as the generation of a fault code, and when a measurable vehicle parameter (engine temperature, oil pressure, oil temperature, etc.) exceeds or falls below a predefined value. In addition to sending performance data to the remote monitoring service according to a data transmission schedule, a vehicle processor can be configured to send a data transmission to the remote monitoring service whenever an anomaly is detected. Such a data transmission can include an identification of the anomaly (i.e., the fault code that was generated or the parameter that exceeded or fell below the predefined value).

In at least one exemplary embodiment, the operational data and fault code data are conveyed in real-time to the monitoring service, so that a diagnosis of a vehicle problem causing the generation of the fault code can occur while the vehicle is operating. Rapid diagnosis of problems can lead to the prevention of damage to the vehicle that might otherwise be caused by continuing to operate the vehicle after a malfunction is detected, where the diagnosis indicates that continued operation of the vehicle would result in such damage. In such circumstances, the driver of the vehicle can be contacted by telephone or other electronic messaging service or data link to ensure that continued operation of the vehicle does not occur. If the diagnosed problem is relatively minor, the operator of the vehicle can be contacted with less urgency, to arrange for a repair when convenient. In an exemplary, but not limiting embodiment, where continued operation of the vehicle is not likely to result in damage, the results of the vehicle diagnosis are forwarded to the vehicle operator, results from the reverse auction for the required repair are generated, service for the vehicle is scheduled, and parts required for the service are ordered, all while the vehicle continues to operate.

In at least one exemplary embodiment, operational data is archived whenever a specific user defined operating parameter condition is detected, i.e., an operating parameter above or below a predefined limit. In essence, this approach enables a user to define a custom fault code library (it is recognized that prior art fault codes are tied to specific operating parameters; however, prior art fault codes are predefined at the vehicle manufacturer level, and are not user modifiable or user defined). This concept is referred to herein as a "user defined fault code." Such user defined fault codes can include any user defined single operational parameter level, or a combination of user defined operational parameter levels, that are different from the fault codes defined at the vehicle manufacturer level. In at least one exemplary embodiment, systems implementing the concepts disclosed herein are configured so that user defined fault codes can be defined and implemented while the vehicle is operating. In at least one exemplary embodiment, user defined fault codes are generated at a remote computing device attempting to acquire additional information to be used to diagnose a vehicle, where the user defined fault code is uniquely defined based on archived operational data conveyed to the remote computing device while the vehicle is operating.

In at least one exemplary embodiment, the operational data that is temporarily stored on the vehicle can include operational data that is automatically broadcast by the vehicle while the vehicle is operating. In at least one exemplary embodiment, the temporarily stored operational data includes operational data that must be specifically requested. In yet another exemplary embodiment, the temporarily stored operational data includes both operational data that is automatically broadcast by the vehicle while the vehicle is operating and operational data that must be specifically requested. In general, operational data that must be requested is operational data that can be generated upon request (such as throttle position data), but is not data that is required during normal vehicle operation.

FIG. 7 is another functional block diagram showing the components of a vehicle diagnostic system in accord with the concepts disclosed herein, wherein the performance data includes temporarily stored operational data, and the data link and data buffer are combined into a single component to be added to a vehicle to enable the vehicle to participate in the diagnostic/monitoring program.

In the diagnostic system embodiment of FIG. 7, a system 62 includes a vehicle 64 and a remote computing device 72 for performing diagnostic analysis on data supplied by the vehicle over a wireless network 70. The data can be input by an operator or can be collected using the portable data collection device as described above. Vehicle 64 can also include a plurality of components for collecting operational data, including a brake control unit 66a, an engine control unit 66b, and a transmission control unit 66c, each of which transmit operational data along a data bus 67. While only a single data bus is shown, it should be understood that multiple data buses could be employed. Further, a vehicle controller/processor, such as is shown in FIG. 3, is not illustrated in FIG. 7, but one or more such elements can be coupled to the data bus to receive and use operational data generated by the vehicle. Vehicle 64 also includes an add-on diagnostic unit 68, which combines a data temporary storage, a data link, and a processor.

Diagnostic unit 68 conveys diagnostic logs 76 from vehicle 64 to remote computer 72 via wireless network 70, generally as discussed above. Diagnostic logs 76 include an identified anomaly (such as a fault code) and data temporarily stored in the memory storage of diagnostic unit 68. Remote computer 72 analyzes the diagnostic logs to determine a cause of the anomaly. Remote computer 72 conveys data 74 (which includes one or more of configuration data and diagnostic data) to diagnostic device 68 via the wireless network. The configuration data is used to modify the functions implemented by the processor in diagnostic unit 68. Modifications include, but are not limited to, changing the amount of operational data to be temporarily stored in the data memory storage, changing an amount of operational data collected before an anomaly is conveyed to the remote computing device, changing an amount of operational data collected after an anomaly is conveyed to the remote computing device, changing a type of operational data conveyed to the remote computing device (this enables the remote computing device to request specific types of operational data after a diagnostic log has been received, to facilitate diagnosing the anomaly), and changing a definition of what constitutes an anomaly. The diagnostic data includes data conveyed to the operator of the vehicle, informing the operator of any actions that the operator needs to take in response to the diagnosis. Such diagnostic data can include instructions to cease vehicle operation as soon as possible to avoid unsafe or damaging conditions, instructions to proceed to a designated repair facility selected by the operator as a result of the reverse auction, and/or instructions to proceed with a scheduled route, and to wait to repair the vehicle at a point along the route or after the route is complete.

In an exemplary embodiment, diagnostic device 68 is implemented by using a hardware device permanently or temporarily installed onboard medium and heavy duty (Class 5-8) vehicles, energized by onboard vehicle electrical power systems, and connected to the in-vehicle diagnostic data communications network, which is capable of collecting diagnostic data from the vehicle data communications network and sending it to a remote server. The specific information to be acquired from the vehicle communications data link is remotely configurable. The specific data messages that trigger a data collection event are also remotely configurable. Data transmission from the vehicle includes a wireless interface between the vehicle and the remote server, such as via a cellular modem or other wireless data transmission network. Data received at the remote server may then be forwarded to any defined set of consumers for the diagnostic information to be remotely analyzed and acted upon.

The components of system 62 include the hardware device used to implement diagnostic device 68, hardware programming (firmware), the wireless network, and the remote computing device (such as a computer server/data center). System 62 operates by using the remote computing device to transmit programming/configuration data to the in-vehicle device (i.e., diagnostic device 68) via the wireless network. During vehicle operation, the diagnostic data device stores operational data that is included with all diagnostic log events (i.e., with each fault code or detected anomaly). In an exemplary but not limiting embodiment, the diagnostic log conveyed to the remote computing device from the vehicle includes data such as a diagnostic log file revision, a diagnostic log file type, a device ID, a configured time interval defining the extent of the temporarily stored operational data, and the number of parameters to be stored in the diagnostic log files. The diagnostic data device in the vehicle performs the functions of: storing a list of diagnostic parameters to be monitored and recorded from the vehicle data link at regular periodic intervals (or as otherwise defined); storing a list of event parameters to trigger diagnostic data capture; and storing a time interval for diagnostic parameter recording. In an exemplary but not limiting embodiment, the diagnostic data device is connected to an in-vehicle data link (e.g., a J1939 bus) and vehicle power connections.

During vehicle operation, while the vehicle data link communication is active, the diagnostic data device is continuously monitoring for specific data messages configured to trigger the collection of diagnostic log files. Once diagnostic log files are recorded, they are transmitted via the wireless network to the remote computing device. Diagnostic log files are moved from the data center server within minutes to a destination server where the data may be analyzed and/or distributed for further action.

In an exemplary, but not limiting embodiment, the diagnostic log sent to the remote computing device includes one minute worth of operational data collected both before and after an anomalous event.

In an exemplary, but not limiting embodiment, the diagnostic device in the vehicle can be remotely configured to redefine the parameters used to generate a diagnostic log. The diagnostic log generated by the diagnostic device includes two primary components; at least some of the operational data temporarily stored in the data memory storage, and data defining the anomaly (in some embodiments, fault codes are used to define the anomaly). The diagnostic device can be remotely reconfigured to change an amount of buffered operational data acquired before the anomaly that is included in the diagnostic log. The diagnostic device can be remotely reconfigured to change an amount of temporarily stored operational data acquired after the anomaly that is included in the diagnostic log. The diagnostic device can be remotely reconfigured to change the type of operational data that is included in the diagnostic log (in terms of FIG. 7, the diagnostic device can be remotely reconfigured to selectively determine whether data from brake control unit 66a, data from engine control unit 66b, and/or data from transmission control unit 66c should be included in the diagnostic log, noting that such operational data generating components are exemplary, and not limiting). The diagnostic device can also be remotely reconfigured to define what constitutes an anomaly that triggers sending a diagnostic log to the remote computing device for diagnosis. As discussed above, fault codes defined by the vehicle manufacturer can be considered to be anomalies that will trigger conveying a diagnostic log to the remote location. It should also be recognized that the concepts disclosed herein encompass enabling the diagnostic device to be remotely reconfigured to define a single parameter or a set of parameters (different than the parameters used by manufacturers to define fault codes) that will trigger the conveyance of diagnostic log to the remote location. For example, regardless of the parameters used to define preset fault codes, the diagnostic device can be remotely reconfigured to generate and convey a diagnostic log to the remote location in response to detecting any specified parameter or set parameters in regard to the value(s) of the parameters exceeding or falling below predefined level(s).

FIG. 8 is a functional block diagram showing a pricing service provider 73, a consumer 71, and a plurality of service vendors 75a-75c interacting over the Internet. FIG. 8 is related to FIG. 7, but FIG. 7 is directed to a specific embodiment where the pricing service provider and a vehicle monitoring service are the same entity, whereas, FIG. 8 is more generalized, and encompasses each of the inputs illustrated in FIG. 1B. Referring to FIG. 8, consumer 71 (such as a fleet operator, a monitoring service, or a private vehicle owner) uses a wireless network 70 (such as the Internet) to communicate a service request (either a well defined service request without vehicle performance data, or a less well defined service request with vehicle performance data enabling a service diagnosis to be made by pricing service provider 73 and/or service vendors 75a-75c) to pricing service provider 73, who in turn requests pricing for the requested vehicle service from a plurality of service vendors 75a-75c (noting the number of service vendors in FIG. 8 is exemplary, and not limiting). Once the pricing data has been acquired, the pricing service provider communicates the pricing data to the consumer, generally as discussed above.

As discussed above, the concepts disclosed herein specifically encompass enabling a consumer to access the pricing service provider using a hand held portable computing device, such as a smart phone. FIG. 9 schematically illustrates an exemplary kit 230, designed to facilitate an interaction between a smart phone user and a pricing service provider. Kit 230 includes a hardware interface 234 than enables the smart phone user to extract vehicle performance data from the vehicle into their smart phone as an electronic data file. As discussed above, the vehicle performance data can be used by the pricing service provider, and/or service vendors to identify the service needs of the smart phone user's vehicle. In general, the hardware interface will include a first data port configured to interface with the vehicle, and a second data port configured to interface with the smart phone. Many vehicles include data ports to facilitate extraction of vehicle performance data, and such data ports often share a common form factor. OBD-I and OBD-II hardware ports are well known in the vehicle industry. The use of a well adopted vehicle data port to extract the vehicle performance data into the smart phone means that the first data port on the hardware interface will be compatible with many vehicles. It should also be understood that various adapters can be provided with kit 230, to accommodate less widely used vehicle data ports. Further, hardware interface 234 can be provided with multiple first data ports, each having a form factor designed to interface with a different style vehicular data port (i.e., hardware interface 234 could be provided with both an ODB-I style connector and an OBD-II style connector, or some other connector commonly found in commercial vehicles and heavy trucks). Because many smart phones have data ports configured to interface with proprietary form factors, the second data port of hardware interface 234 may be customized to interface with specific models of smart phones, such that different phones will require a different kit (another option would be to include a plurality of different adaptors with the kit, enabling the same second data port to interface with smart phones having data ports exhibiting different form factors).

Optional elements to include in kit 230 are software 232 (to be added to the smart phone to facilitate interaction with the pricing service provider), a hardware interface 236 (for exporting vehicle performance data from the smart phone to a desktop or laptop computer, so the consumer can use the Internet to communicate with the pricing service provider, even if their smart phone is not web enabled), and instructions 238 (including but not limited to instructions for using hardware interface 234, instructions for interacting with the pricing service provider, instructions for extracting vehicle performance date from a vehicle, instructions for using software 232, and instructions for formulating a service request to be sent to the pricing service provider). Software 232 (such software is often referred to as an app, application, or applet) can be used to improve the user experience for the smart phone user, as smart phones do not have the graphics processing power (and certainly not the screen size) as desktop computers. For example, in at least one embodiment, software 232 can help improve the visualization of websites intended to be viewed on larger screens.

In the smart phone embodiment, the smart phone user can employ their smart phone not only to convey the service request and vehicle performance data to the pricing service provider, but also to perform any of the following functions: receiving pricing quotes from the pricing service provider, scheduling a service from a specific vendor, and paying the pricing service provider and/or the selected service vendor. Such payments can be implemented based on verbal communication, or by using a web enabled smart phone to convey an electronic payment.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A system for receiving a vehicle service request for a specific vehicle and providing pricing data from one or more vendors able to provide service for the specific vehicle, comprising:
   (a) a memory in which a plurality of machine instructions are stored;
   (b) a data link for receiving the vehicle service request;
   (c) a processor coupled to the memory and to the data link, said processor executing the machine instructions to carry out a plurality of functions, including:
      in response to receiving the vehicle service request, instructing an operator of the specific vehicle to acquire electronic vehicle performance data from a data port on the specific vehicle and to transmit the electronic vehicle performance data acquired by the operator from the data port on the specific vehicle over the data link, the electronic vehicle performance data being useful in diagnosing a vehicle service that is required;

(ii) in response to receiving the electronic vehicle performance data from the specific vehicle, evaluating the electronic vehicle performance data from the specific vehicle to validate the vehicle service that is required;

(iii) upon validating the vehicle service that is required, conveying the vehicle service request to a plurality of vendors, to enable each vendor interested in responding to the vehicle service request to provide a price quote for their services; and (iv) in response to receiving a price quote from a vendor, conveying the price quote to at least one entity selected from a group of entities consisting of:
(A) the operator of the specific vehicle; and
(B) a third party able to convey the price quote to the operator of the specific vehicle.

2. The system of claim 1, wherein conveying the vehicle service request to the plurality of vendors includes hosting a reverse auction for servicing the specific vehicle based on the vehicle service request, wherein any vendor interested in servicing the specific vehicle enters a bid in the reverse auction.

3. The system of claim 2, wherein conveying the price quote includes using at least one communication technique selected from a group of communication techniques consisting of:
(a) communicating the price quote via email;
(b) communicating the price quote via a text message on a cellular phone;
(c) communicating the price quote via a voicemail message;
(d) generating a webpage upon which vendor information can be viewed, the vendor information including information about the vendor and the vendor's price quote; and
(e) updating a previously generated webpage to add vendor information for an additional vendor.

4. The system of claim 1, wherein conveying the price quote includes conveying at least one type of additional information along with the price quote, the at least one type of additional information being selected from a group of additional information consisting of:
(a) an indication of how quickly each vendor can provide service for the specific vehicle, based on data provided by each vendor; and
(b) a distance between a vehicle location where the specific vehicle will be located when it will be available to be repaired and each vendor, based, in part, on vehicle location data included in the vehicle service request.

5. A system for receiving a vehicle service request for a specific vehicle and providing pricing data from one or more vendors able to provide service for the specific vehicle, comprising:
(a) a memory in which a plurality of machine instructions are stored;
(b) a data link for receiving the vehicle service request;
(c) a processor coupled to the memory and to the data link, said processor executing the machine instructions to carry out a plurality of functions, including:
(i) in response to receiving the vehicle service request, instructing an operator of the specific vehicle to acquire electronic vehicle performance data from a data port on the specific vehicle and to transmit the electronic vehicle performance data acquired by the operator from the data port on the specific vehicle over the data link, the electronic vehicle performance data being useful in diagnosing a vehicle service that is required;

(ii) in response to receiving the electronic vehicle performance data from the specific vehicle, conveying the vehicle service request and the electronic vehicle performance data from the specific vehicle to a plurality of vendors, to enable each vendor interested in responding to the vehicle service request to validate the vehicle service that is required and provide a price quote for their services; and (iii) in response to receiving a price quote from a vendor, conveying the price quote to at least one entity selected from a group of entities consisting of:
(A) the operator of the specific vehicle; and
(B) a third party able to convey the price quote to the operator of the specific vehicle.

6. The system of claim 5, wherein the machine instructions cause the processor to carry out a reverse auction for servicing the specific vehicle based on the vehicle service request, wherein any vendor interested in servicing the specific vehicle enters a bid.

7. The system of claim 5, wherein the electronic vehicle performance data includes at least one of the following types of operational data: engine coolant temperature, engine speed, throttle position, brake temperature, vehicle speed, brake position, and gearbox parameters.

8. The system of claim 5, wherein the machine instructions cause the processor to convey the price quote using at least one communication technique selected from a group of communication techniques consisting of:
(a) communicating the price quote via email;
(b) communicating the price quote via a text message on a cellular phone;
(c) communicating the price quote via a voicemail message;
(d) generating a webpage upon which vendor information can be viewed, the vendor information including information about the vendor and the vendor's price quote; and
(e) updating a previously generated webpage to add vendor information for an additional vendor.

9. The system of claim 8, wherein at least one webpage displays a reverse auction and each vendor can access the at least one webpage and adjust their price quote based on price quotes offered by other vendors, in order to stimulate competitive price quotes.

10. The system of claim 8, wherein at least one webpage provides at least one type of additional information selected from a group of additional information consisting of:
(a) an indication of how quickly each vendor can provide service for the specific vehicle, based on data provided by each vendor, including a time for parts to service the specific vehicle to be ordered; and
(b) a distance between a future vehicle location where the specific vehicle will be located when it will be available to be repaired and each vendor, based, in part, on the future vehicle location being included with the vehicle performance data.

11. The system of claim 8, wherein at least one webpage provides a rating of each vendor, wherein the rating is displayed on the at least one webpage as at least one graphic icon representing the vendor's quality rating adjacent to an identification of the vendor, where a relatively greater num- 12. The system of claim 5, wherein the machine instructions further cause the processor to carry out a function of using the processor to analyze the electronic vehicle performance data to diagnose what service is required, where the analysis is implemented before the electronic vehicle performance data is conveyed to the plurality of vendors, such that the service diagnosis is included in vehicle information conveyed to each vendor.

13. The system of claim 5, wherein the machine instructions carry out a function causing the processor to convey the price quote in a manner that withholds vendor identification information to ensure that the operator of the vehicle operator and vendor cannot complete a transaction without interacting with a host requesting the price quotes from the vendors.

14. The system of claim 5, wherein conveying the vehicle service request and the electronic vehicle performance data from the specific vehicle to a plurality of vendors includes conveying the vehicle service request and the electronic vehicle performance data from the specific vehicle to a remote computing device to analyze the electronic vehicle performance data from the specific vehicle to diagnose what service is required based on the electronic vehicle performance data, and including that diagnosis in vehicle information conveyed to each vendor.

15. The system of claim 14, wherein the remote computing device using the electronic vehicle performance data from the specific vehicle to diagnose what service is required based on the electronic vehicle performance data includes comparing at least some of the electronic vehicle performance data to a plurality of data records, each data record corresponding to a different mechanical fault.

16. The system of claim 5, wherein receiving the vehicle service request for the specific vehicle includes receiving the vehicle service request at a pricing service provider wherein a party conveying the vehicle service request to the pricing service provider comprises at least one party selected from a group of parties consisting of:
   (a) an owner of the vehicle;
   (b) an operator of the vehicle;
   (c) a fleet operator;
   (d) a private individual consumer; and
   (e) a third party monitoring service that monitors data acquired from the vehicle to determine service needs of the vehicle.

* * * * *